United States Patent
Suzuki et al.

(10) Patent No.: US 7,605,930 B2
(45) Date of Patent: Oct. 20, 2009

(54) IMAGE PROCESSING DEVICE

(75) Inventors: Masashi Suzuki, Nagoya (JP); Tomoaki Hattori, Nagoya (JP); Katsuyuki Yokoi, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1103 days.

(21) Appl. No.: 10/636,568

(22) Filed: Aug. 8, 2003

(65) Prior Publication Data

US 2004/0027594 A1    Feb. 12, 2004

(30) Foreign Application Priority Data

Aug. 9, 2002  (JP)  ............................. 2002-234166
Aug. 9, 2002  (JP)  ............................. 2002-234167
Aug. 9, 2002  (JP)  ............................. 2002-234168

(51) Int. Cl.
*G06F 15/00*  (2006.01)
*G06K 9/00*  (2006.01)

(52) U.S. Cl. ..................................... 358/1.14; 382/100

(58) Field of Classification Search ............... 358/1.14, 358/1.18, 1.16, 1.9, 517, 529; 382/100, 254, 382/167; 400/61, 62; 709/203, 228
See application file for complete search history.

(56) References Cited

U.S. PATENT DOCUMENTS

| | | | |
|---|---|---|---|
| 4,169,285 A | | 9/1979 | Walker |
| 6,101,272 A | * | 8/2000 | Noguchi ..................... 382/167 |
| 7,079,272 B2 | * | 7/2006 | Hatayama ................... 358/1.15 |
| 7,126,718 B1 | * | 10/2006 | Newman et al. ............. 358/1.9 |
| 2001/0053246 A1 | * | 12/2001 | Tachibana et al. ........... 382/162 |
| 2003/0095705 A1 | * | 5/2003 | Weast ......................... 382/167 |

FOREIGN PATENT DOCUMENTS

| | | |
|---|---|---|
| JP | A 62-112192 | 5/1987 |
| JP | A 63-282883 | 11/1988 |
| JP | A 7-256972 | 10/1995 |
| JP | A 9-247478 | 9/1997 |
| JP | A 10-81042 | 3/1998 |

(Continued)

OTHER PUBLICATIONS

K. Nakamura et al., "The color for presentations considered persons with color vision deficiencies," The Institute of Electronics, Information and Communication Engineers 86(I):29-32, 2003.

(Continued)

*Primary Examiner*—Saeid Ebrahimi Dehkordy
(74) *Attorney, Agent, or Firm*—Oliff & Berridge, PLC

(57) ABSTRACT

A color blindness dialog box in a Properties window includes a color blindness process mode checkbox enabling a user to select a printing process designed for color blindness. When the color blindness process mode checkbox is checked, it is determined whether the image to be printed includes problematic areas for people with color blindness. If so, image data for these areas is extracted and displayed in a popup window. Subsequently, a borderline process is performed to form a borderline on either or both of the border areas and of text data and graphics data. Thus, the problematic areas are extracted and processed properly so that the problematic areas will become easy to distinguish.

42 Claims, 21 Drawing Sheets

FOREIGN PATENT DOCUMENTS

| | | |
|---|---|---|
| JP | A 2001-202221 | 7/2001 |
| JP | A 2001-508889 | 7/2001 |
| JP | A 2001-293926 | 10/2001 |
| JP | A 2002-55671 | 2/2002 |
| JP | A 2002-125129 | 4/2002 |
| JP | A 2002-197403 | 7/2002 |

OTHER PUBLICATIONS

Gary Swift, "Colors for the Colorblind", Jun. 29, 1997, 1-4.

Kaoru Nakamura & Osamu Oicajima, "The Color for Presentations Considered Persons with Color Vision Deficiencies", vol. 86, No. 1, The Institute of Electronics, Information and communication Engineers, Jan. 2003, pp. 29-32, with Abstract.

\* cited by examiner

IMAGE PROCESSING DEVICE

BACKGROUND OF THE INVENTION

1. Field of the Invention

The present invention relates to an image processing device.

2. Description of Related Art

In recent years, there has been a proliferation of image forming devices, such as printers, capable of forming rich colorful images. These printers include laser printers as well as inkjet printers.

This technology has made it possible to produce color documents quickly and efficiently on color printers for use in business conference discussions and presentations.

SUMMARY OF THE INVENTION

However, color documents created on color printers and distributed in conferences, presentations and the like may have colors that are difficult to differentiate by people with color blindness. It is noted that color blindness includes: total (or complete) color blindness and partial (or incomplete) color blindness. People with total color blindness are unable to perceive colors and therefore are unable to distinguish chromatic colors, at all. Total color blindness is called also as achromatopsia. People with partial color blindness are unable to distinguish certain chromatic colors. The partial color blindness includes: dichromatic color blindness; and anomalously trichromatic color blindness. Dichromatic colorblind people are missing one of the three (red, green, and blue) color-sensitive photopigments in their retinal cones. The dichromatic colorblind people include: people with protanopia who are missing red-sensitive pigments, people with deuteranopia who are missing green-sensitive pigments, and people with tritanopia who are missing blue-sensitive pigments. The anomalously trichromatic people have all the three pigments but one or more of the three pigments may be abnormal. The anomalously trichromatic color blind people include: people with protanomalous who have abnormal red sensitivity, people with deuteranomalous who have abnormal green sensitivity, and people with tritanomalous who have abnormal blue sensitivity.

In view of the foregoing, it is an object of the present invention to provide an image processing device capable of forming images that can easily be distinguished by people with color blindness.

In order to attain the above and other objects, the present invention provides an image processing device. For processing image data. The image processing device includes: an image input portion receiving image data indicative of an image; and an image processing portion processing the image data into processed image data indicative of a processed image which has image portions easy to distinguish.

It is preferable that the image processing portion may process the image data indicative of an image, which has image portions difficult to distinguish by people with color blindness, into the processed image data indicative of the processed image whose corresponding image portions are easy to distinguish by people with color blindness.

According to another aspect, the present invention provides an image processing device for processing image data. The image processing device includes: an image input portion receiving image data indicative of an image; and a color image processing portion processing a color state of an entire part of the original image by processing the original image into a first color image and a second color image whose color state is different from color state of the first color image.

According to another aspect, the present invention provides an image forming device for forming images. The image forming device includes: an image input portion receiving image data indicative of an image; an image processing portion processing the image data into processed image data indicative of a processed image which has image portions easy to distinguish; and an image output portion forming the processed image based on the processed image data on a recording medium.

According to another aspect, the present invention provides an image processing method for processing image data. The image processing method includes: receiving image data indicative of an image; and processing the image data into processed image data indicative of a processed image which has image portions easy to distinguish.

According to another aspect, the present invention provides an image processing program for processing image data. The image processing program includes: a program of receiving image data indicative of an image; and a program of processing the image data into processed image data indicative of a processed image which has image portions easy to distinguish.

According to another aspect, the present invention provides a printer driver executed by a terminal device connected to an image forming device. The printer driver includes: a program of receiving image data indicative of an image; a program of processing the image data into processed image data indicative of a processed image which has image portions easy to distinguish; and a program of controlling an image forming device to form the processed image based on the processed image data on a recording medium.

According to another aspect, the present invention provides an image processing device installed with an image processing program. The image processing program includes: a program of receiving image data indicative of an image; and a program of processing the image data into processed image data indicative of a processed image which has image portions easy to distinguish.

According to another aspect, the present invention provides an image processing method for processing image data, comprising: receiving image data indicative of an image; and processing a color state of an entire part of the original image by processing the original image into a first color image and a second color image whose color state is different from color state of the first color image.

According to another aspect, the present invention provides an image processing program for processing image data, comprising: a program of receiving image data indicative of an image; and a program of processing a color state of an entire part of the original image by processing the original image into a first color image and a second color image whose color state is different from color state of the first color image.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
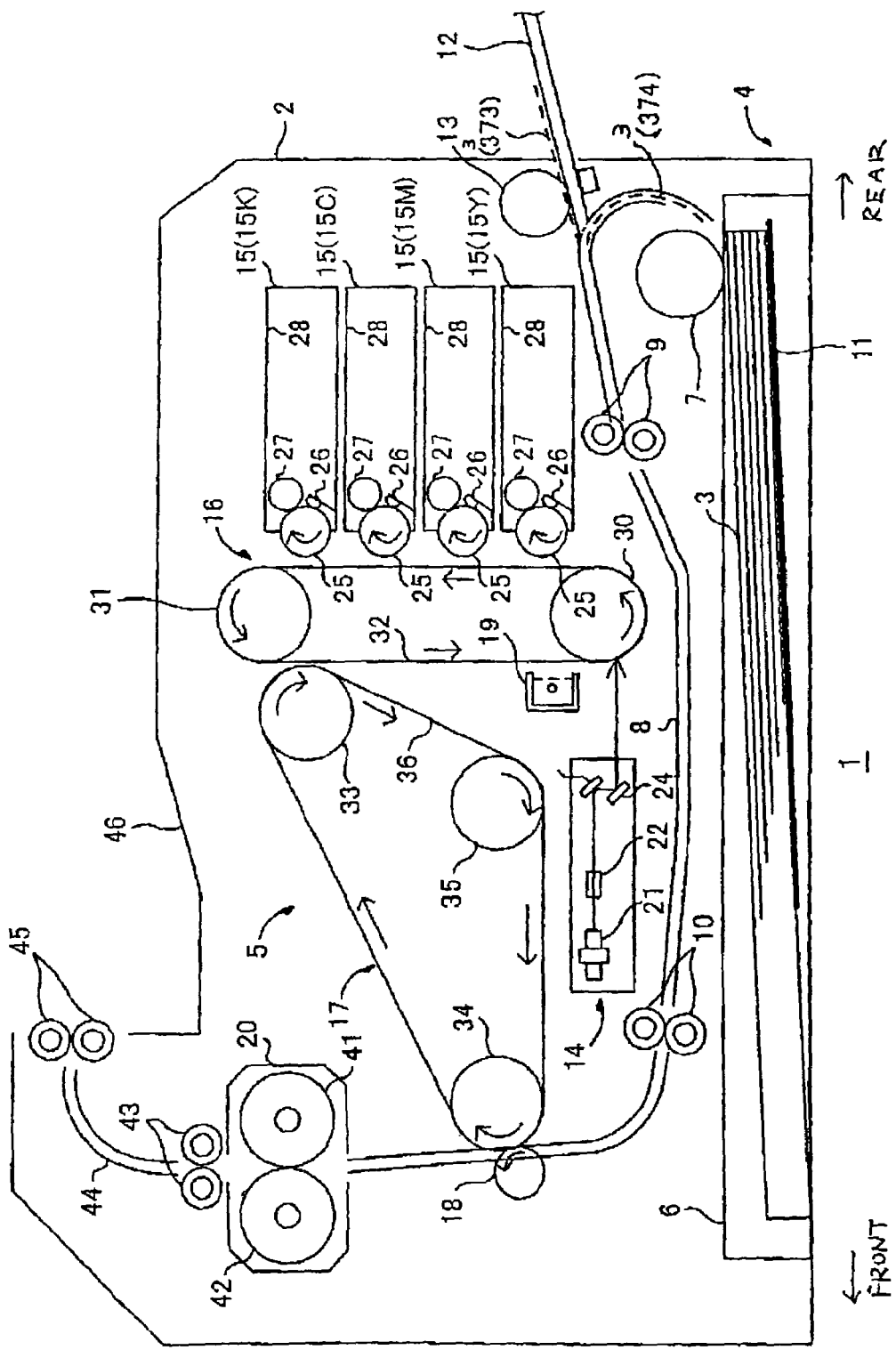
FIG. 1 is a side cross-sectional view showing a color laser printer according to a first preferred embodiment of the present invention.

An image processing device according to preferred embodiments of the present invention will be described while referring to the accompanying drawings wherein like parts and components are designated by the same reference numerals to avoid duplicating description.

First Embodiment

First, a first embodiment of the present invention will be described below with reference to FIGS. 1-11(b).

FIG. 1 is a side cross-sectional view showing the relevant parts of a color laser printer 1 according to a preferred embodiment. As shown in FIG. 1, the color laser printer 1 includes: a main casing 2 and, within the main casing 2, a feeder unit 4 for feeding sheets of a paper 3 as a recording medium, an image forming unit 5 for forming images on the paper 3 supplied from the feeder unit 4, and the like.

The feeder unit 4 includes: a paper supply tray 6 detachably mounted in the bottom section of the main casing 2, a feed roller 7 disposed on one side of the paper supply tray 6 (hereinafter, the side of the main casing 2 in which the feed roller 7 is provided will be referred to as the back side, while the side in which a transfer roller 18 described later is provided will be referred to as the front side), a paper supply path 8, a pair of conveying rollers 9 disposed downstream of the feed roller 7 in the conveying direction of the paper 3 (hereinafter, upstream or downstream in the conveying direction of the paper 3 will be abbreviated as simply "upstream", or "downstream") in the paper supply path 8, and register rollers 10 provided downstream from the conveying rollers 9 in the conveying direction of the paper 3 and on the paper supply path 8.

The paper supply tray 6 is shaped like an open-top box and is provided with a paper pressing plate 11 for accommodating the stacked papers 3. The paper pressing plate 11 is pivotably supported by the end furthest from the feed roller 7, enabling the end nearest the feed roller 7 to move vertically. A spring not shown in the drawings is disposed on the underside of the paper pressing plate 11, urging the paper pressing plate 11 upward.

The spring, not shown in the drawing, on the underside of the paper pressing plate 11 presses the topmost sheet of paper 3 on the paper pressing plate 11 against the feed roller 7. The rotation of the feed roller 7 feeds the single topmost sheet of paper 3 into the paper supply path 8.

The paper supply path 8 begins from an upstream end near the feed roller 7, runs upward, and then curves toward the front of the main casing 2. The paper supply path 8 extends in a substantially flat shape from the back side toward the front side of the main casing 2 over the paper supply tray 6. From the front end, the paper supply path 8 curves upward to pass through a transfer position (the point at which the transfer roller 18 opposes a first intermediate transfer member support roller 34 described later). The downstream end of the paper supply path 8 leads to a fixing unit 20 described later.

The conveying rollers 9 and the register rollers 10 are disposed along the paper supply path 8 near the back and front ends, respectively.

Fed by the feed roller 7 into the paper supply path 8, the paper 3 is first made to reverse directions along the paper supply path 8, after which the conveying rollers 9 conveys the paper 3 to the register rollers 10, from the back end to the front end of the paper supply path 8 Subsequently, the register rollers 10 register the paper 3 and then convey the paper 3 to the transfer position.

The feeder unit 4 of the color laser printer 1 further includes a multipurpose tray 12 on which paper 3 of an arbitrary size, such as postcards, is stacked, and a multipurpose feed roller 13 for feeding the paper 3 stacked on the multipurpose tray 12 into the color laser printer 1.

The multipurpose tray 12 is disposed in the back side of the main casing 2 slanted with the front end downward near a portion of the paper supply path 8 between the feed roller 7 and the conveying rollers 9. The multipurpose feed roller 13 is disposed above the multipurpose tray 12 and in confrontation with the same.

The topmost sheet among the papers 3 stacked on the multipurpose tray 12 is supplied as a single sheet to the paper supply path 8 by the rotation of the multipurpose feed roller 13. As described above, the paper 3 supplied to the paper supply path 8 is conveyed from the conveying rollers 9 to the register rollers 10 and, after registration, is conveyed by the register rollers 10 to the transfer position.

The image forming unit 5 includes a scanning unit 14, a plurality (four) of developer cartridges 15, a photosensitive belt mechanism 16, an intermediate transfer belt mechanism 17, the transfer roller 18, a Scorotron charging device 19, the fixing unit 20, and the like.

The scanning unit 14 is positioned above the paper supply path 8 in the main casing 2 and below the intermediate transfer belt mechanism 17 and includes a laser-emitting element (not shown), a polygon mirror 21 that is driven to rotate, a lens 22, and reflecting mirrors 23 and 24. In the scanning unit 14, the laser-emitting unit emits a laser beam based on image data. The laser beam passes through or reflects off of the polygon mirror 21, lens 22, and reflecting mirrors 23 and 24 in sequence, as shown by the arrow in the drawing, and is irradiated in a high-speed scanning motion onto the surface of a photosensitive belt 32 in the photosensitive belt mechanism 16 described later.

The four developer cartridges 15 are arranged in the back section of the main casing 2, parallel to one and another, and aligned vertically with a prescribed interval between adjacent cartridges. The developer cartridges 15 include a yellow developing cartridge 15Y for accommodating yellow toner, a magenta developing cartridge 15M for accommodating magenta toner, a cyan developing cartridge 15C for accommodating cyan toner, and a black developing cartridge 15K for accommodating black toner.

Each of the developer cartridges 15 includes a developing roller 25, a thickness regulating blade 26, a supply roller 27, and a toner accommodating chamber 28. Each of the developer cartridges 15 can be moved in the horizontal direction by a contacting/separating mechanism not shown in the drawings. In this way, the developing roller 25 can be put into contact with or separated from the surface of the photosensitive belt 32 described later.

Each of the toner accommodating chambers 28 accommodates a toner of a different color, including one of the colors yellow, magenta, cyan, and black. Each toner is a positively charged nonmagnetic single-component toner. Specifically, the toner used in the preferred embodiment is a polymerized toner obtained by copolymerizing a polymerized monomer using a well-known polymerization method such as suspension polymerization. The polymerized monomer may be, for example, a styrene monomer such as styrene or an acrylic monomer such as acrylic acid, alkyl (C1-C4) acrylate, or alkyl (C1-C4) meta acrylate. The polymerized toner is formed as particles substantially spherical in shape in order to have excellent fluidity. The toner is compounded with a coloring agent or wax, as well as an additive such as silica to improve fluidity. The diameter of the toner particles is about 6-10 μm.

The supply roller 27 and the developing roller 25 are rotatably disposed in each of the developer cartridges 15 and contact each other with a degree of pressure. The developing roller 25 is driven to rotate by a main motor not shown in the drawings, such that the direction of rotation at the point the developing roller 25 contacts the photosensitive belt 32 described later (the nip part) is from bottom to top (in the clockwise direction). A developing bias is applied to the developing roller 25.

The thickness regulating blade 26 is disposed below the supply roller 27 and applies pressure to the surface of the developing roller 25 on the side opposite from the photosensitive belt 32.

Toner accommodated in the toner accommodating chamber 28 is supplied to the developing roller 25 by the rotation of the supply roller 27. At this time, the toner is positively charged through triboelectrification between the supply roller 27 and the developing roller 25. The toner carried on the developing roller 25 rotates along with the rotation of the developing roller 25 and passes between the thickness regulating blade 26 and the developing roller 25, forming a thin layer of toner having a uniform thickness on the developing roller 25.

The photosensitive belt mechanism 16 is disposed along the front side of the four developer cartridges 15. The photosensitive belt mechanism 16 includes a photosensitive member support roller 30 opposing the yellow developing cartridge 15Y in the bottommost position; a photosensitive member drive roller 31 opposing the black developing cartridge 15K in the topmost position and positioned vertically above the photosensitive member support roller 30; and the photosensitive belt 32, which is an endless belt looped around the photosensitive member support roller 30 and a photosensitive member drive roller 31. A photosensitive layer formed of an organic photosensitive material is provided on the surface of the photosensitive belt 32. The photosensitive belt 32 extends vertically in order to contact all of the developing rollers 25.

When a motive force is transferred from the main motor not shown in the drawings to the photosensitive member drive roller 31 in the photosensitive belt mechanism 16, the photosensitive member drive roller 31 is driven to rotate (in the counterclockwise direction). As the photosensitive member support roller 30 follows the rotations of the photosensitive member drive roller 31 (in the counterclockwise direction), the photosensitive belt 32 moves in a cycle between the photosensitive member support roller 30 and the photosensitive member drive roller 31 (in the counterclockwise direction).

With this configuration, the photosensitive belt 32 moves in a direction from the developing roller 25 in the yellow developing cartridge 15Y in the bottom most position toward the developing roller 25 in the black developing cartridge 15K in the topmost position. In other words, at the point of contact with the developing roller 25 (nip part), the photosensitive belt 32 moves upward, in the same direction as the developing roller 25.

The intermediate transfer belt mechanism 17 is disposed above the scanning unit 14 and on the front side of the photosensitive belt mechanism 16. The intermediate transfer belt mechanism 17 includes an intermediate transfer member drive roller 33, a first intermediate transfer member support roller 34, and a second intermediate transfer member support roller 35, and an intermediate transfer belt 36. The intermediate transfer belt 36 is an endless belt formed of a resin, such as a conductive polycarbonate or a polyimide including dispersed carbon or other conductive particles.

The intermediate transfer member drive roller 33 is disposed in opposition to the photosensitive member drive roller 31 such that the photosensitive belt 32 and intermediate transfer belt 36 are interposed therebetween The first intermediate transfer member support roller 34 is positioned diagonally downward and toward the front of the main Casing 2 in relation to the intermediate transfer member drive roller 33 and is disposed in opposition to the transfer roller 18 described later, such that the intermediate transfer belt 36 is interposed therebetween. The second intermediate transfer member support roller 35 is positioned below the intermediate transfer member drive roller 33 and toward the back of the main casing 2 in relation to the first intermediate transfer member support roller 34. Hence, the intermediate transfer member drive roller 33, first intermediate transfer member support roller 34, and second intermediate transfer member support roller 35 are arranged in a substantially triangular shape around which the intermediate transfer belt 36 is looped.

The motive force from the main motor not shown in the drawings is transferred to the intermediate transfer member drive roller 33, causing the intermediate transfer member drive roller 33 to rotate (in the clockwise direction). The first intermediate transfer member support roller 34 and second intermediate transfer member support roller 25 are configured to follow the intermediate transfer member drive roller 33 (in the clockwise direction), such that the intermediate transfer belt 36 runs around the intermediate transfer member drive roller 33, first intermediate transfer member support roller 34, and second intermediate transfer member support roller 35 (in the clockwise direction).

With this construction, the intermediate transfer belt 36 confronts and contacts the photosensitive belt 32 at the intermediate transfer member drive roller 33 and moves in the same direction as the photosensitive belt 32 at this point of contact (nip part).

The transfer roller 18 is disposed in opposition to the first intermediate transfer member support roller 34, with the intermediate transfer belt 36 interposed therebetween, such that the transfer roller 18 contacts the surface of the intermediate transfer belt 36. The transfer roller 18 rotates (in the counterclockwise direction), such that the surface of the transfer roller 18 moves in the same direction as the surface of the intermediate transfer belt 36 at the point of contact with the intermediate transfer belt 36 (nip point). The transfer roller 18 is configured to move to a contact position in contact with the intermediate transfer belt 36 when transferring a color image onto a sheet of the paper 3 and to move to a separated position separate from the intermediate transfer belt 36 when not performing a transfer operation, by means of the contacting/separating mechanism not shown in the drawings.

Further, the transfer roller 18 is driven by the main motor not shown in the drawings, while a transfer bias is applied to transfer roller 18.

The Scorotron charging device 19 is disposed not in contact with the surface of the photosensitive belt 32, but a prescribed distance therefrom, and is positioned near the photosensitive member support roller 30 on the upstream side of the same in relation to the movement of the photosensitive belt 32. The Scorotron charging device 19 is a positive-charging Scorotron type charger for generating a corona discharge from a tungsten wire or the like. The Scorotron charging device 19 is configured to apply a positive charge uniformly across the surface of the photosensitive belt 32.

After the Scorotron charging device 19 applies a uniform positive charge to the surface of the photosensitive belt 32, the surface is exposed to the high-speed scanning of the laser beam emitted from the scanning unit 14, thereby forming latent images according to prescribed image data.

Next, when the connecting/separating mechanism not shown in the drawings places the developing roller 25 of a particular developer cartridge 15 in contact with the photosensitive belt 32 on which a latent image has been formed, then a toner image is formed on the photosensitive belt 32 in the single color of the toner accommodated in that specific developer cartridge 15 When the toner image of this color formed on the photosensitive belt 32 is brought opposite the intermediate transfer belt 36, the toner image is transferred onto the intermediate transfer belt 36. A multi-color image is formed by sequentially overlaying images of different colors on the intermediate transfer belt 36.

For example, it is now assumed that the connecting/separating mechanism not shown in the drawings moves the yellow developing cartridge 15Y in the bottommost position horizontally toward the front of the main casing 2, such that the developing roller 25 in the yellow developing cartridge 15Y contacts the photosensitive belt 32 on which a latent image has been formed. At the same time, the magenta developing cartridge 15M, cyan developing cartridge 15C, and black developing cartridge 15K are moved horizontally toward the back of the main casing 2, thereby separating the respective developing rollers 25 from the photosensitive belt 32. Accordingly, a toner image in yellow is formed on the photosensitive belt 32 by the yellow toner accommodated in the yellow developing cartridge 15Y. Next, when this yellow toner image moves opposite the intermediate transfer belt 36 by the movement of the photosensitive belt 32, the yellow image is transferred to the intermediate transfer belt 36.

By repeatedly forming latent images on the photosensitive belt 32 as described above and appropriately moving each developer cartridges 15 horizontally with the connecting/separating mechanism, the developing roller 25 of the magenta developing cartridge 15M positioned second from the bottom can be placed in contact with the photosensitive belt 32, while the remaining developing rollers 25 are separated therefrom, to form a toner image in magenta on the photosensitive belt 32 using the magenta toner accommodated in the magenta developing cartridge 15M. Similarly, when the magenta toner image moves opposite the intermediate transfer belt 36, the magenta image is transferred to the intermediate transfer belt 36 and superimposed on the yellow toner image that has been transferred previously.

The same operations are repeated using cyan toner accommodated in the cyan developing cartridge 15C and black toner accommodated in the black developing cartridge 15K to form a multi-color image on the surface of the intermediate transfer belt 36.

The multi-color image formed on the surface of the intermediate transfer belt 36 in this way is transferred at once onto the paper 3, as the paper 3 passes between the intermediate transfer belt 36 and the transfer roller 18 that is moved into the contact position.

The fixing unit 20 is disposed above the transfer roller 18 and on the downstream end of the paper supply path 8. The fixing unit 20 includes a heating roller 41, and a pressure roller 42 applying pressure to the heating roller 41, and conveying rollers 43. The heating roller 41 is formed of metal and includes a halogen lamp for generating heat. The heat generated by the heating roller 41 fixes a color image transferred onto the surface of the paper 3 as the paper 3 passes between the heating roller 41 and the pressure roller 42.

After the color image is fixed on the paper 3 in the fixing unit 20, the conveying rollers 43 convey the paper 3 onto a discharge path 44. Discharge rollers 45 disposed on the downstream end of the discharge path 44 discharge the paper 3 onto a discharge tray 46 formed on the top of the main casing 2.

Figure 2:
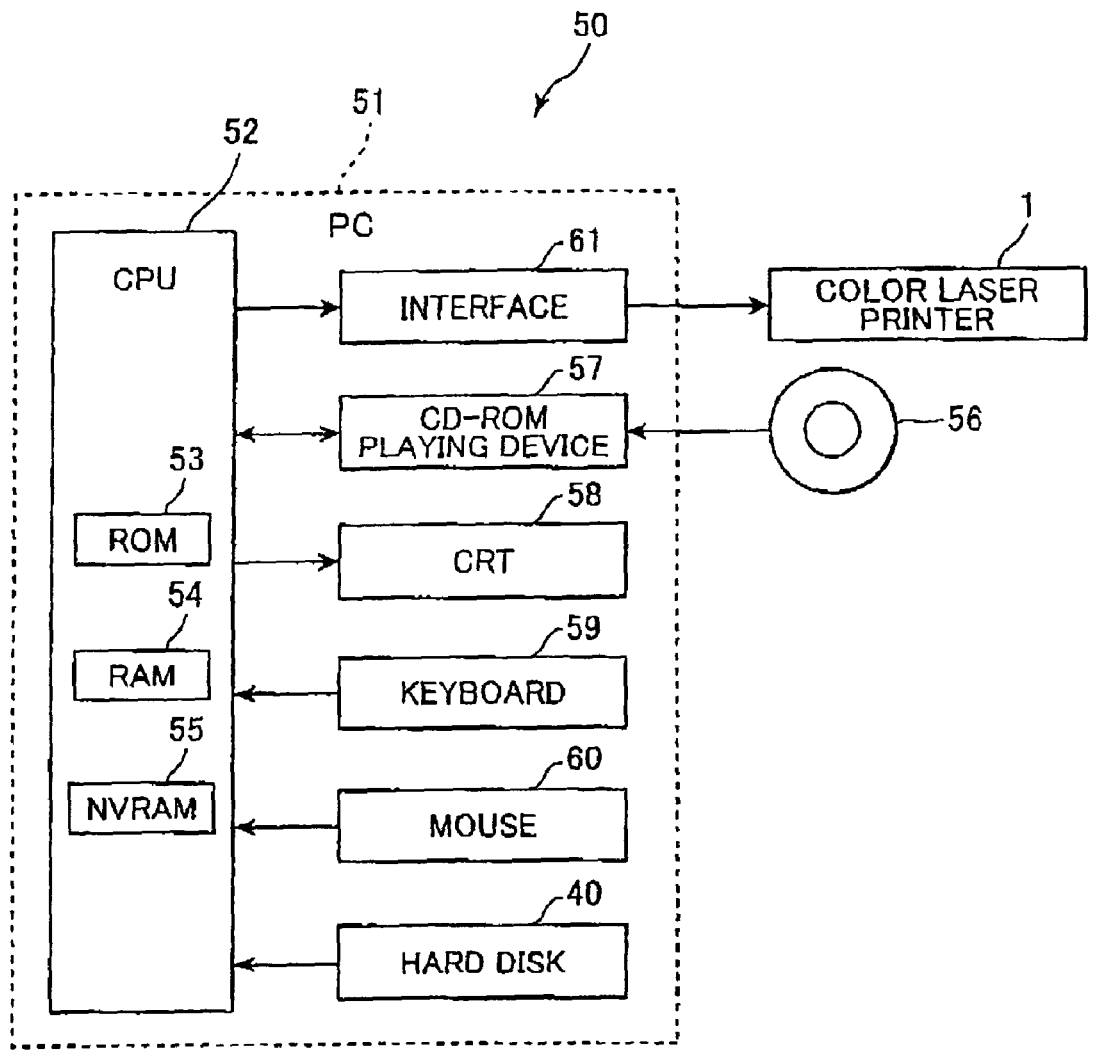
FIG. 2 is a block diagram showing a computer system, according to the first embodiment, connected to the color laser printer of FIG. 1.
Figure 3:
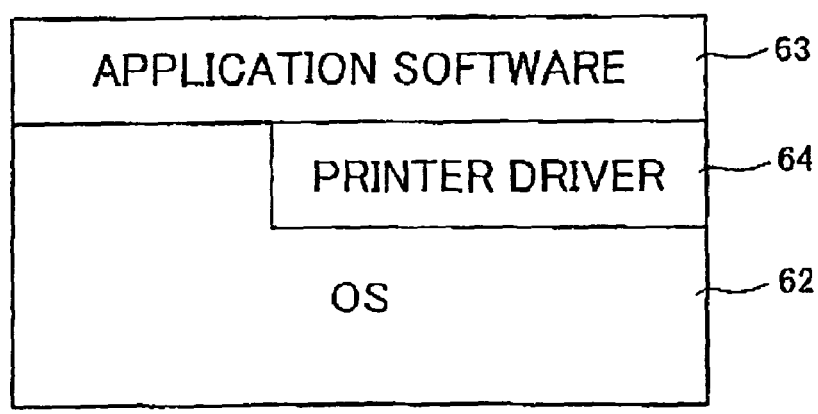
FIG. 3 is a block diagram showing the hierarchical structure in the computer of FIG. 2 for launching a printer driver of the first embodiment.

FIG. 2 is a block diagram showing a print system 50. The print system 50 includes the color laser printer 1 and a personal computer 51 (terminal device) connected to the color laser printer 1. The print system 50 serves as an image processing-and-forming system for processing image data and forming the processed image. The personal computer 51 serves as an image processing device for processing image data according to the first embodiment of the present invention, and the color laser printer 1 serves to form the processed image. FIG. 3 is a block diagram showing the hierarchical structure in the personal computer 51 for driving a printer driver.

The personal computer 51 includes a CPU 52 for implementing control of the device and, within the CPU 52, a ROM 53 for storing control programs, a RAM 54 having a work memory, and a NVRAM 55 that continues storing data after the power is turned off. The personal computer 51 further includes a CD-ROM playing device 57 for loading and playing a CD-ROM 56, a CRT monitor 58, a keyboard 59, and a mouse 60 for performing various operations on the screen of the CRT monitor 58, a hard disk 40 on which are installed an operating system (OS) 62, an application software 63, a printer driver 64, and an interface 61 for connecting the personal computer 51 to a variety of external devices. Each of the above components is connected to the CPU 52. The personal computer 51 is connected to the color laser printer 1, by connecting the interface 61 to an interface provided in the color laser printer 1.

The printer driver 64 is originally stored on the CD-ROM 56 and includes an image processing program for creating a print job to be transmitted to the color laser printer 1. When the CD-ROM 56 is loaded into the CD-ROM playing device 57, the printer driver 64 is installed on the hard disk 40. As shown in FIG. 3, the printer driver 64 is loaded on top of the prescribed operating system (OS) 62 in an executable state.

The printer driver 64 includes a print control command The print control command is a normal image processing program for converting image data, which has been created with the application software 63 and which includes text and graphics of a data format conforming to the operating system 62, into image data in a format such as page description language (PDL) that can be received by the color laser printer 1, and for transmitting the converted image data to the color laser printer 1. In addition to this print control command, the printer driver 64 according to the present embodiment further includes a color blindness process mode (image process for color blindness). The color blindness process mode is another image processing program for forming images that people with color blindness can easily read.

According to the print control command (normal image processing program), an image including text and graphics and created by the application software 63 is converted into image data of PDL including text data and graphics data other than the text data. The image data of PDL is transmitted as a print job to the printer 1 through the interface 61. The printer 1 receives the PDL image data including text data and graphics data, and processes the PDL image data for printing. In other words, the printer 1 reads data of color, size, font, thickness, and the like of text and graphics, converts the data into CMYK print data, and prints the corresponding text and graphics. It is noted that image data of PDL may be processed into CMYK print data before being transmitted as a print job to the printer 1 through the interface 61.

The printer driver 64 further includes: a color-image extracting program, a text-graphics existence judging program, a text-graphics overlap judging program, a color-determining program, and a brightness-determining program as will be described later. These programs are executed during the color blindness process mode.

Next, the color blindness process mode of the printer driver 64 will be described in detail.

For example, a user uses the application software 63 to create images for use in a conference or presentation. Subsequently, if the user wishes to print out the image in a form that can be easily read by people with color blindness, first the user controls the personal computer 51 to display the properties of the printer driver 64. To do this, the user can perform an operation well known in the art for selecting the Print window (not shown) from the application software 63 and selecting Properties from the displayed Print window.

Figure 4:
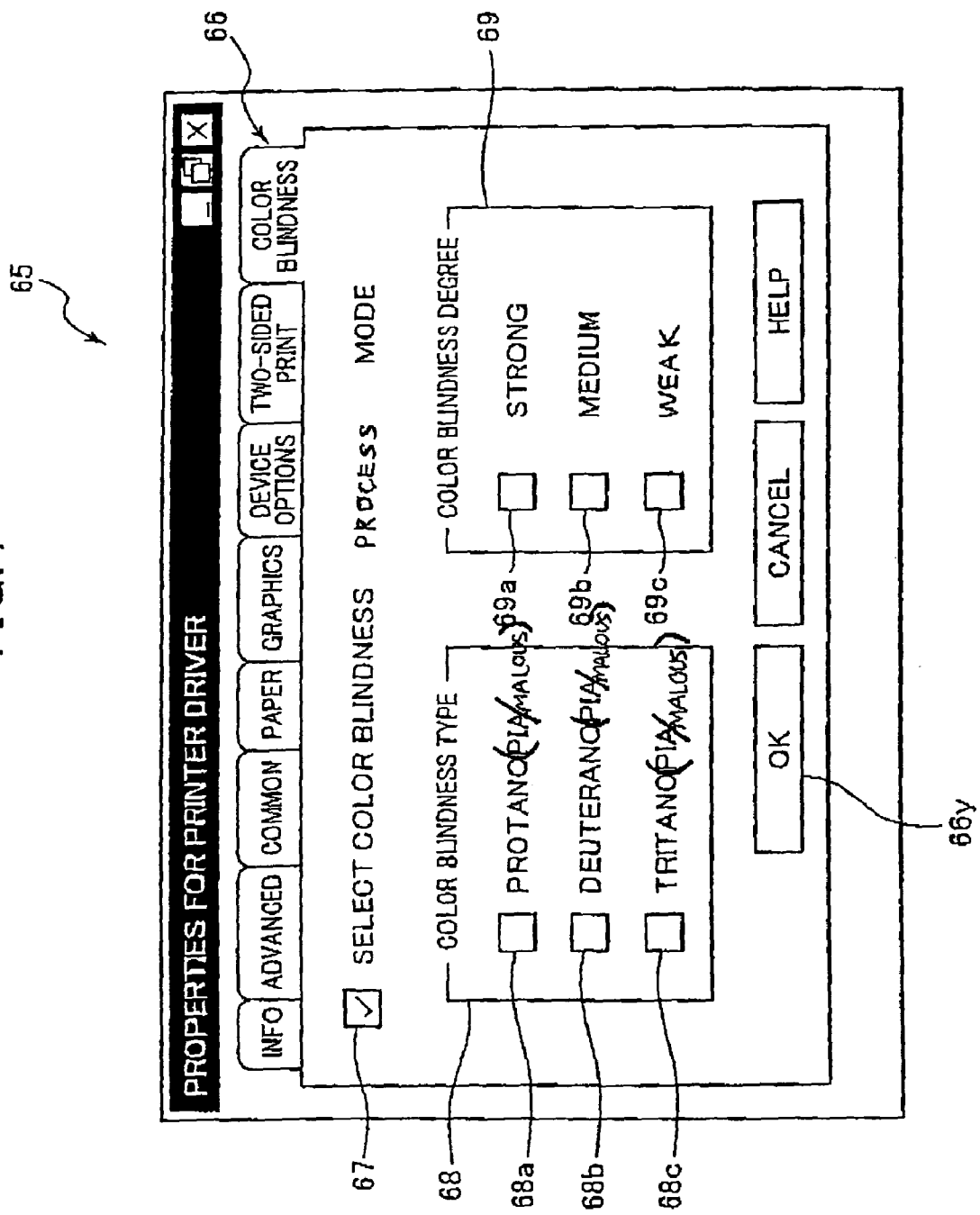
FIG. 4 is an explanatory diagram showing a Properties window for a printer driver that is displayed on the CRT display shown in FIG. 2 according to the first embodiment.

After the user selects Properties for the printer driver 64 in this way, a Properties window 65 such as that shown in FIG. 4 is displayed.

The Properties window 65 includes a plurality of dialog boxes, such as an "Info" dialog box, an "Advanced" dialog box, a "Common" dialog box, a "Paper" dialog box, a "Graphics" dialog box, a "Device Options" dialog box, a "Two-Sided Print" dialog box, and a "Color Blindness" dialog box. By clicking and selecting a dialog box, the user can display the desired dialog box on top and can perform various settings. As shown in FIG. 4, a Color Blindness dialog box 66 is displayed on the top.

A color blindness process mode checkbox 67 is provided in the Color Blindness dialog box 66 for selecting the color blindness process mode in order to form images that people with color blindness can easily read.

When the user wishes to print images that can be easily read by people with color blindness, the user inserts a check in this color blindness process mode checkbox 67.

If the color blindness process mode checkbox 67 has been checked, the printer driver 64 executes a process of the color blindness process mode when performing a page process described later. In this way, a suitable process for people with color blindness can be performed.

It is noted that the check in the color blindness process mode checkbox 67 can be removed when the process need not consider people with color blindness. Hence, by not selecting the color blindness process mode, processing can be performed more efficiently by preventing an increase in extra processing.

The Color Blindness dialog box 66 also includes a color blindness type setting box 68 and a color blindness degree setting box 69 as the input selection display controlling means. The color blindness type setting box 68 lists types of color blindness, allowing the user to input one of the listed types. The color blindness degree setting box 69 displays degrees of color blindness, allowing the user to input one of the listed degrees.

In the color blindness type setting box 68 of this example, the user can input data for three types of color blindness. More specifically, the color blindness type setting box 68 includes a "protano(pia/malous)" selection for difficulty in distinguishing the color red from other colors, a "deuterano(pia/malous)" selection for difficulty in distinguishing the color green from other colors, and a "tritano(pia/malous)" selection for difficulty in distinguishing the color blue from other colors. Checkboxes are provided next to each, enabling the user to select one of the three types of color deficiencies. For example, protanopia or protanomalous is selected by checking a checkbox 68a next to the "protano(pia/malous)" selection. Deuteranopia or deuteranomalous is selected by checking a checkbox 68b next to the "deuterano(pia/malous)" selection. Finally, tritanopia or tritanomalous is selected by checking a checkbox 68c next to the "tritano(pia/malous)" selection. It is noted that when one type of color blindness is selected, a corresponding color combination of is set as a target color combination. For example, when protanopia or protanomalous is selected, a color combination of red and green is set as the target color combination. When deuteranopia or deuteranomalous is selected, the same color combination of red and green is set as the target color combination. When tritanopia or tritanomalous is selected, another color combination, blue and green, for example, is set as the target color combination.

The color blindness degree setting box 69 is configured to enable the user to input a degree of color blindness. More specifically, in this example the degree of color blindness is divided into three levels including "strong," "medium," and "weak." Checkboxes corresponding to each level are also provided. For example, a strong degree is selected by checking a checkbox 69a next to "strong." A medium degree is selected by checking a checkbox 69b next to the "medium." Finally, a weak degree is selected by checking a checkbox 69c next to "weak."

It is noted that when one degree of color blindness is selected, a corresponding value is set as a brightness threshold value. For example, when strong is selected, a value "60" is set as the brightness threshold value. When medium is selected, another value "40" is set as the brightness threshold value. When weak is selected, another value "20" is set as the brightness threshold value.

More specifically, if the checkbox 68a in the color blindness type setting box 68 is checked to select protano(pia/malous) and the checkbox 69a in the color blindness degree setting box 69 is checked, for example, then the degree and type of color blindness is set to a strong protano(pia/malous). The color combination of red and green is set as a target color combination and "60" is set as the brightness threshold. When an OK button 66y provided in the Color Blindness dialog box 66 is clicked thereafter, the processing for color blindness starts being executed. The selection of the color blindness process mode and data related to color blindness inputted in the color blindness type setting box 68 and the color blindness degree setting box 69 are stored in the NVRAM 55. The data related to color blindness stored in the NVRAM 55 will be referred to during the color blindness process. Accordingly, it is possible to form a suitable image corresponding to the selected type and degree of color blindness that can be easily read by people with a specific type of color blindness.

It is noted that the user can modify the data for color blindness and the selection of the color blindness process mode at any time by displaying the Color Blindness dialog box 66. After modifying the selection of the color blindness process mode and data related to color blindness, this data is stored in the NVRAM 55.

By storing the color blindness process mode selection and data inputted for color blindness in the NVRAM 55, the user can omit steps required to select the color blindness process mode selection and input data for color blindness at every printing operation when the same data is used repeatedly for people with a specific type of color blindness.

In the input operations of the Color Blindness dialog box 66, it is possible to input the type after inputting the degree. Further, when the degree of color blindness is not known, it is possible to input the type of color blindness and execute the process of the image processing program without inputting a degree of color blindness. In such a case the strong degree is set and therefore the brightness threshold "60" is set. Similarly, when the type of color blindness is not known, it is possible to input the degree of color blindness and execute the process of the image processing program without inputting the type of color blindness. In such a case, the protano(pia/malous) is set and the target color combination of red and green is set.

The user instructs a printing operation after inputting the various settings in the Color Blindness dialog box 66. More specifically, the user instructs the printing operation according to a method of operations well known in the art. That is, the user sets the scope of the printed page, the number of pages to print, and the like in the Print window (not shown), and finally clicks an OK button to execute the printing process.

Figure 5:
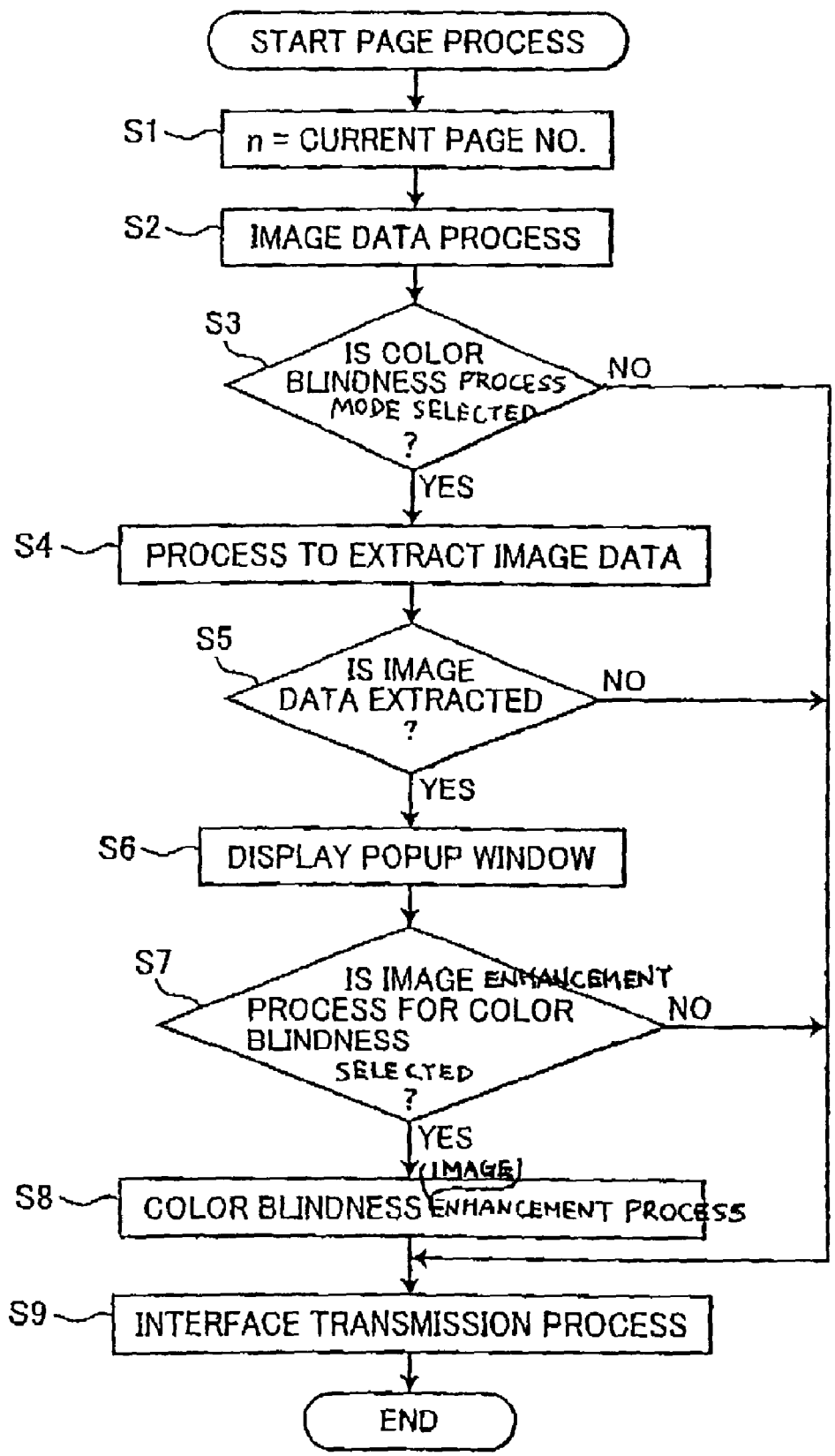
FIG. 5 is a flowchart showing a page process according to the printer driver of the first embodiment.

When the printing process starts being executed, the steps in the page process shown in FIG. 5 are executed for each page in a single job set in the Print window.

In S1 at the beginning of the page process, the current page number is verified.

In S2 an image data process is executed to receive data of the image created by the application software 63 and to convert the received data into image data that can be printed on the color laser printer 1. In this example, this data process converts the received data into page description language (PDL). That is, data indicative of texts and graphics included in the original image is converted into text data and graphics data of the PDL that can be printed on the color laser printer 1.

After the image data process is completed, in S3 the CPU 52 determines whether the color blindness process mode has been selected: If the color blindness process mode has not been selected (S3: NO), in other words, when the color blindness process mode checkbox 67 next to the color blindness process mode in FIG. 4 is not checked, then the process for the color blindness process mode is skipped, and the program proceeds to S9. In S9, an interface transmission process is performed in the normal print mode. During the interface transmission process, the PDL data is converted into CMYK data before being sent to the printer 1. Such a conversion can be omitted, but the PDL data may be sent to the printer 1 as they are. After the process of S9 is completed, the program ends.

Figure 6A:
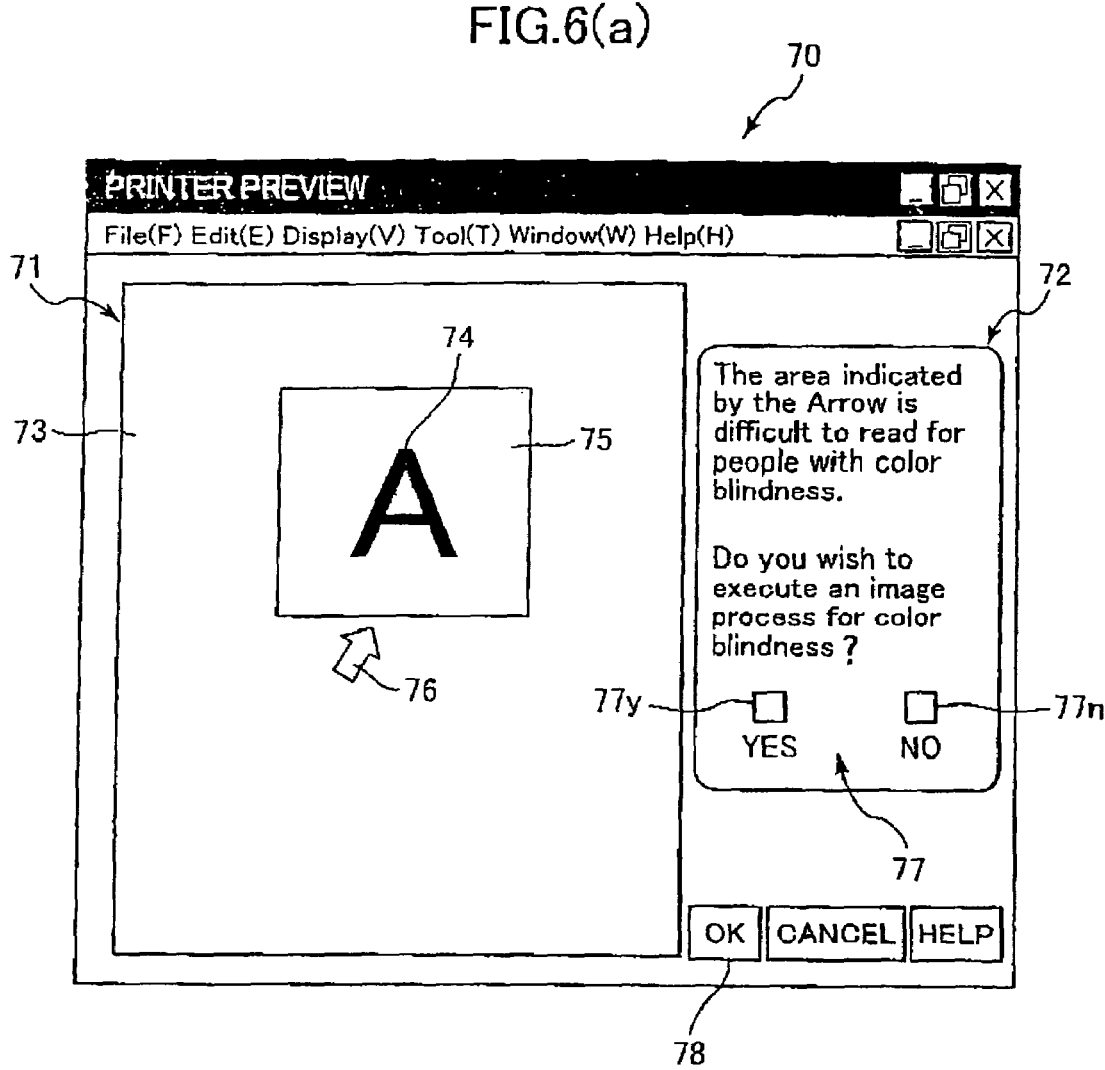
FIG. 6(a) is an explanatory diagram showing an example popup window displayed on the screen of the CRT display of FIG. 2 according to the first embodiment.

On the other hand, if the color blindness process mode has been selected (S3: YES), in other words, if the color blindness process mode checkbox 67 in FIG. 4 has been checked, then the process proceeds to S4. In S4, an image data extracting process is executed to determine whether the image data includes image regions that are difficult to read by people with color blindness whose type and degree has been set by the setting boxes 68 and 69 in FIG. 4 and to extract image data for these image regions when they exist. Then, the process proceeds to S5, in which it is judged whether some image regions that are difficult to read have been extracted. If no such problematic image region is extracted (no in S5), the process proceeds directly to S9. If some troublesome image region is extracted (yes in S5) the process proceeds to a pop up window display process of S6 to display a pop up window 70 as shown in FIG. 6(a).

More specifically, in S4, a process to try extracting image data for such a problematic image region difficult to read for the people with color blindness is performed by executing the color-image extracting program The extracting process of S4 will be described below in greater detail.

In S4, first, the text-graphics existence judging program is executed to determine whether the PDL-image data includes both of text data and graphics data therein.

If text or graphics data is not included in the PDL-image data, it is known that it is unnecessary to continue executing the extracting process of S4. This is because text data is important to be read accurately by people. Accordingly, the process of S4 is completed and the judgment of S5 is made negative (no in S5), and therefore, the process proceeds directly to S9.

On the other hand, if both of text data and graphics data are included in the PDL-image data, then the text-graphics overlap judging program is executed to determine whether the text data and graphics data are overlapped with each other at least partly. More specifically, it is judged whether or not text data and graphics data are superimposed one on another at least partly by examining coordinate points in the text data and graphics data. If some coordinate point in the text data match some coordinate point in the graphics data, the text data and graphics data are determined to overlap each other at least partly If text data and graphics data do not overlap at any points, it is known that it is unnecessary to continue executing the extracting process of S4. Accordingly, the process of S4 ends and the judgment of S5 is made negative (no in S5), and therefore, the process proceeds directly to S9.

On the other hand, if text data and graphics data are superimposed on each other, it is known that a color region of the text data and a color region of the graphics data are located adjacent to each other and therefore that there exists some bordering area between the color region of the text data and the color region of the graphics data Accordingly, the color-image extracting program determines whether colors that are difficult for people with color blindness to distinguish are used in the bordering area.

More specifically, its is determined whether pixels with colors falling in the target color combination set by selection on the setting box 68 are located adjacent to each other in the bordering area.

For example, if the checkbox 68a next to the "protano(pia/malous)" selection or the checkbox 68b next to the "deuterano(pia/malous)" selection is checked in the color blindness type setting box 68, the combination of red and green is set as the target color combination, and therefore it is judged whether pixels of red-type color and pixels of green-type color are located adjacent to each other in the bordering area between text and traphics.

In order to execute this determination, first, a color-determining program is executed to determine color type of each pixel in the text data and the graphics data that are determined as being superimposed with each other.

The color-determining process will be described below in greater detail.

Image data of PDL normally includes color data R (red), G (green), and B (blue) for each pixel. The text data therefore includes color data R (red), G (green), and B (blue) for each pixel located in the image region of the text. Similarly, the graphics data includes color data R (red), G (green), and B (blue) for each pixel located in the image region of the graphics. The color of the pixel is represented by the mixture of these three primary colors R (red), G (green), and B (blue). It is noted that by modifying the gradation of these three primary colors, a wide array of colors visible to humans can be created. The three primary colors R (red), G (green) and B (blue) have, for example, 256 gradation levels, that is, 0-255 gradation levels.

The color-determining process therefore classifies each pixel in each of the text data and the graphics data as being a red type color (reddish color), a green type color (greenish color), or another type of color by comparing the gradation values R (red), G (green), and B (blue) of the subject pixel in a manner described below.

More specifically, it is determined that a pixel has a red type color (reddish color) when the gradation value R (red) is larger than the gradation values G (green) and B (blue), and when the difference in gradation values for the R (red) and the color with the second largest gradation value is larger than the difference between gradation values for the color having the second largest gradation value and the color having the third largest gradation value. In other words, it is determined that a pixel has a red type color if either one of the following conditions (1) and (2) is satisfied:

$$R>G>B, \text{ and } R-G>G-B \qquad (1)$$

$$R>B>G, \text{ and } R-B>B-G \qquad (2).$$

It is determined that a pixel has a green type color (greenish color) when the gradation value G (green) is larger than the gradation values R (red) and B (blue), and when the difference in gradation values for the G (green) and the color with the second largest gradation value is larger than the difference between gradation values for the color having the second largest gradation value and the color having the third largest gradation value. In other words, the color-determining process determines that a pixel has a green type color if either one of the following conditions (3) and (4) is satisfied:

$$G>R>B, \text{ and } G-R>R-B \qquad (3)$$

$$G>B>R, \text{ and } G-B>B-R \qquad (4).$$

It is determined that a pixel has another type of color when any of the above-described conditions (1)-(4) are not satisfied.

Next, it is determined whether or not there exists, in the bordering area between text data and graphics data, some part in which pixels categorized as having one color in the target color combination are located adjacent to pixels categorized as having the other color in the color combination. For example, if the checkbox 68a or 68b has been checked, it is determined whether pixels categorized as red type color and pixels categorized as green type color are located adjacent to one another in the bordering area.

If there exist some pixels of the target color combination (red and green, in this example) are located neighboring to each other in the bordering area, a brightness-determining program is executed to determine the brightnesses of those neighboring pixels of the target color combination.

The brightness-determining program is executed to determine, by calculating the following equation (5), the brightness X of each pixel in the neighboring pixels of the target color combination (red and green, in this example):

$$\text{Brightness } X = sr + tg + ub \tag{5}$$

wherein the brightness r of the red component is determined based on the gradation level R (red) of the subject pixel, the brightness g of the green component is determined based on the gradation level G (green) of the subject pixel, and the brightness b of the blue component is determined based on the gradation level B (blue) of the subject pixel, and s, t, and u are coefficients. In this way, the brightness X of each pixel is determined by multiplying the brightness values r, g, b of the R (red), G (green), and B (blue) colors by coefficients s, t, and u, respectively, and then by adding the results together. For example, s is equal to 0.30, t is equal to 0.59, and u is equal to 0.11, and therefore the sum of the coefficients s, t, and u is equal to 1. The degree of brightness X is categorized as a level from 0 to 255.

Through the process of this brightness-determining program, the brightness of each pixel is reliably determined.

Then, it is judged whether the difference in the brightness of the neighboring pixels of the target color combination is smaller than the brightness threshold set by the selection on the setting box 69.

If the difference is greater than the brightness threshold set, it is known that the neighboring pixels are easy to distinguish. If the difference is smaller than or equal to the brightness threshold, it is known that the neighboring pixels are difficult to distinguish.

For example, when the checkbox 68a or 68b and the checkbox 69c for "weak" have been checked, if the difference in the brightness levels of the red and green neighboring pixels is within the brightness threshold 20, then these pixels are determined as difficult to distinguish by people with weak protano(pia/malous) or deuterano(pia/malous). When the checkbox 68a or 68b and the checkbox 69b for "medium" have been checked, if the difference in the brightness levels of the red and green neighboring pixels is within the brightness threshold 40, then these pixels are determined as difficult to distinguish by people with medium protano(pia/malous) or deuterano(pia/malous). When the checkbox 68a or 68b and the checkbox 69a for "strong" have been checked, if the difference in the brightness levels of the red and green neighboring pixels is within the brightness threshold 60, then these pixels are determined as difficult to distinguish by people with strong protano(pia/malous) or deuterano(pia/malous).

If it is determined that the bordering area has no neighboring pixels difficult to distinguish, it is known that the bordering area is easy to distinguish. Accordingly, no image region is extracted. Therefore, the process of S4 ends, the judgment process of S5 is made negative (no in S5), and the process proceeds directly to S9.

On the other hand, if It is determined that the bordering area has some neighboring pixels difficult to distinguish, it is known that the bordering area is difficult to distinguish.

When it is determined that the bordering area between the text and the graphics is difficult to distinguish, then an image region including this bordering area is extracted as an image region that is difficult to read by people with color blindness with the user's selected type and degree. As a result, the process of S4 ends, the judgment of S5 is made affirmative (S5: YES), and the process proceeds to S6.

In 56, the extracted image region is displayed in a popup window 70 on the screen of the CRT monitor 58, as shown in FIG. 6(a).

Accordingly, by extracting image regions that are difficult to read for people with color blindness of the user's selected type and degree and by reporting these extracted image regions to the user, the user can perform a process appropriate to the people with color blindness. It is possible to execute a post-process that is appropriate to the type and degree of color blindness. This post-process can form images that are easy to read for those people with the color blindness of the selected type and degree.

FIG. 6(a) is an explanatory diagram showing an example of a screen of the CRT monitor 58 that is displaying the popup window (popup window 70).

In the example of FIG. 6(a), the popup window 70 includes a preview window 71 showing the printing region and a settings area 72.

The preview window 71 displays a preview showing how images created by the user with the application software 63 will appear when printed.

The preview window 71 includes a preview region 73, which is the printable region for one page of image data. Text data 74 and graphics data 75 created by the user with the application software 63 are displayed within the preview region 73. An arrow 76 or the like indicates the area that is difficult to read by people with color blindness.

In this example, it is now assumed that the checkbox 68a next to the "protano(pia/malous)" selection or the checkbox 68b next to the "deuterano(pia/malous)" selection has been checked in the color blindness type setting box 68, and that the checkbox 69a for "strong" has been checked in the color blindness degree setting box 69. It is also assumed that as shown in FIG. 6(a), the image data has text data 74 indicative of a character "A" of red color and graphics data 75 indicative of a square-shaped figure of green color. The text data 74 and the graphics data 75 are located as being superimposed one on another. The difference between the brightness level of the pixels in the text data 74 and the brightness level of the pixels in the graphics data 75 is within the brightness threshold "60". In the bordering area between the text 74 and the graphics 75, therefore, pixels categorized as red-type-color pixels are located adjacent to pixels categorized as green-type-color pixels. The brightness levels of the neighboring red-type and green-type color pixels are similar to each other. Accordingly, in S4, the image region indicated by the arrow 76 that includes both the text data 74 and the graphics data 75 is extracted as an image region difficult to read for people with strong protano(pia/malous) or deuterano(pia/malous). The extracted image region is displayed on the pop up window 70 as indicated by arrow 76. Accordingly, it is possible to execute a post-process that can form the text data 74 and the graphics data 75 in a manner that the text data 74 and the graphics data 75 can be distinguished by people with protano(pia/malous) and deuterano(pia/malous) who have difficulty distinguishing red from green and who account for the majority of people with color blindness.

The settings area 72 includes a message indicating that an image region difficult for people with color blindness to read exists in the created image. Process execution buttons 77 are displayed below this message as the image process selecting portions, enabling the user to indicate whether to perform an image process for color blindness described later.

The message in the settings area 72 is a notification such as "The area indicated by the arrow is difficult to read for people with color blindness." With this display, the user can perceive at a glance that a region of the image is difficult to read for people with color blindness.

The process execution buttons 77 enable the user to select one of the two choices "Yes" and "No," for example. A checkbox corresponding to each selection is provided adjacent thereto. Hence, the user can select to execute the Image process for people with color blindness described later by checking a checkbox 77y next to the "Yes." Alternatively, the user can select not to execute this process by checking a checkbox 77n for "No."

After the user checks the "Yes" checkbox 77y, for example, the user clicks an OK button 78 provided in the preview window 71 to execute the image process for color blindness. The selection is stored in the NVRAM 55. However, if the user clicks the OK button 78 after checking the "No" checkbox 77n, the image process for color blindness is not executed. This selection is stored in the NVRAM 55.

Further, the data stored in the NVRAM 55 indicating whether or not to execute the color blindness image process can be modified at any time by displaying the preview window 71. After modifying the data, the modified data is stored in the NVRAM 55.

By enabling the user to select whether to execute the color blindness image process in the checkboxes 77 in this way, the user can check the "No" checkbox 77n when it is not necessary to execute the color blindness image process. Selecting not to execute the color blindness image process prevents an increase in excess processing, thereby improving processing efficiency. When it is necessary to execute the color blindness image process, however, it is possible to perform a process suitable for people with color blindness by checking the "Yes" checkbox 77y to indicate a desire to execute the color blindness image process.

Further, the selection made in the checkboxes 77 is also stored in the NVRAM 55, as is the selection in the color blindness process mode checkbox 67 and the settings in the color blindness type setting box 68 and the color blindness degree setting box 69. Hence, when the settings are used repeatedly for a specific person with color blindness, the steps for making selections and inputting data each time can be omitted.

If the user has selected to execute the color blindness image process by indicating a selection in the checkbox 77y and clicking on the OK button 78 (S7: YES), then in S8 an image-enhancement process for color blindness begins. As a result, image data for regions difficult to read by people with color blindness is converted into image data that is easy to read for such people. In this example, at least a part of the image region including the text data 74 and the graphics data 75 is converted into image data that is easy to read for such people. As a result, this process can form images that are easily understood by people with color blindness. After the process of S8 is completed, the program proceeds to S9.

On the other hand, if the user has selected not to execute the color blindness image process (S7: NO), then this process is skipped and in S9 the interface transmission process is executed.

Next, the color blindness image-enhancement processing of S8 will be described in detail.

It is noted that when two color regions, that is, a first color region with first color and a second color region with second color are located adjacent to each other, the first color region has a first border area and the second color region has a second border area, and the first and second border areas are located directly adjacent to each other. The color blindness image-enhancement process targets image data of these first and second border areas, and converts color in at least one of the first and second border areas to another color that is different from the first and second colors. As a result, the first and second color regions will become way to distinguish.

Figure 6B:
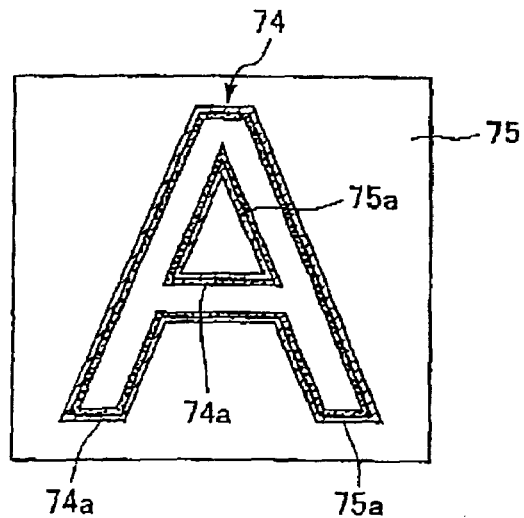
FIG. 6(b) illustrates a border area of a text image and a border area of a graphics image.

In this example, as shown in FIG. 6(b), the red text 74 has a border area 74a, and the green graphics (square figure) 75 has a border area 75a. The red border area 74a and the green border area 75a are located directly adjacent to each other. In this case, in S8, color of the border area 74a is converted into color different from red and green. Or, color of the border area 75a may be converted into color different from red and green, Or, colors of both of the border areas 74a and 75a may be converted into colors different from red and green.

Figure 7:
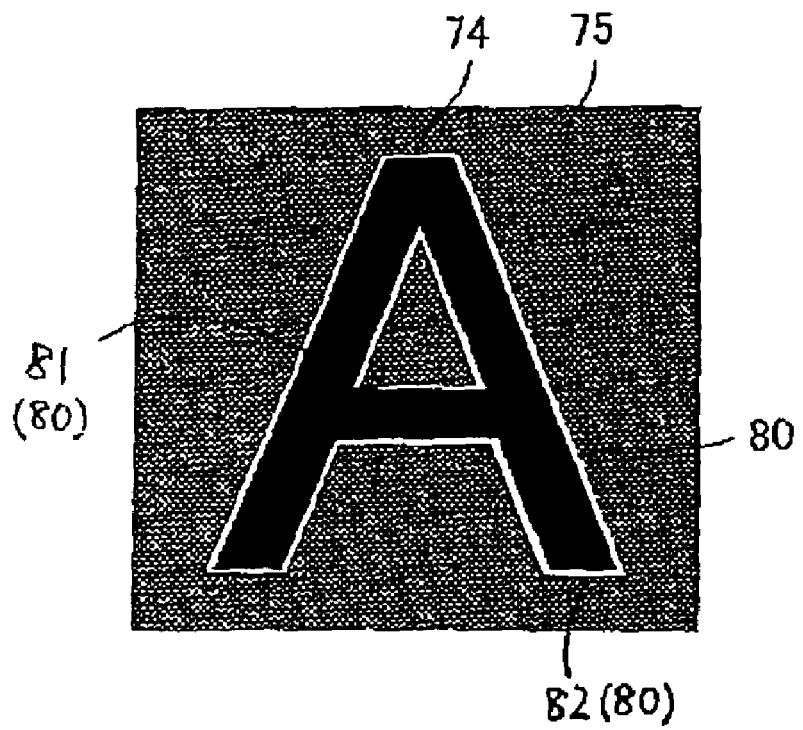
FIG. 7 is an explanatory diagram showing an example of image data that is obtained by a borderline process (white borderline process)

As a specific example, FIG. 7 shows image data that includes the text data 74 and the graphics data 75 both formed of dark colors. For example, the text data 74 is a dark red color and the graphics data 75 is a dark green color. In this case, in S8, a borderline process is executed not to form the image of the text data 74 at its border area 74a. Or, the borderline process may be executed not to form the image of the graphics data 75 at its border area 75a. Or, the borderline process may be executed not to form the images of the text data 74 and the graphics data 75 at both of their border areas 74a and 75a. Hence, when printing on a white paper 3, a white borderline 80 is formed in the border area between the text 74 and the graphics 75.

It is noted that the borderline process may be executed not to form the image of the text data 74 in its border area 74a at some region, while not to form the image of the graphics data 75 in its border area 75a at another region. For example, as shown in FIG. 7, the borderline 80 includes an inter borderline part 81 which is located in the internal side of the text 74 and an outer borderline part 82 which is located in the external side of the text 74. The inter borderline part 81 may be formed by not forming the image of the text data 74 in its border area 74a, while the outer borderline part 82 may be formed by not forming the image of the graphics data 75 in its border area 75a.

With this process, the text and graphics can be clearly separated, making it easy for people with color blindness to distinguish the text data 74 from the graphics data 75. Further, since the image for one color is not formed in this bordering region, the consumption of toner for that color can be decreased. The number of dots required to form the white borderline 80 is selected to suit the resolution of the color laser printer 1.

It is noted that the brightness-determining program using the equation (5) as described above is also used to determine whether colors of the text 74 and the graphics 75 are dark colors. For example, if the pixels in both of the two image data 74 and 75 have brightness levels X of lower than or equal to a predetermined value (127), then both image data 74 and 75 are determined to be dark colors and the borderline process is executed to Form the white borderline 80 described above.

As described above, the color blindness dialog box 66 in the Properties window 65 includes the color blindness process mode checkbox 67 enabling the user to select a printing process designed for color blindness. When the color blindness process mode checkbox 67 is checked, it is determined whether the image to be printed includes problematic areas for people with color blindness. If 90, image data for these areas is extracted and displayed in the popup window 70. Subsequently, a borderline process is performed to form a borderline 80 on either or both of the border areas 74a and 75a of the text data 74 and the graphics data 75. Thus, the problematic areas are extracted and processed properly so that the problematic areas will become easy to distinguish. Adding the borderline 80 can enable not only people with color blindness but also people with no color blindness to easily distinguish text data 74 and graphics data 75.

Figure 8:
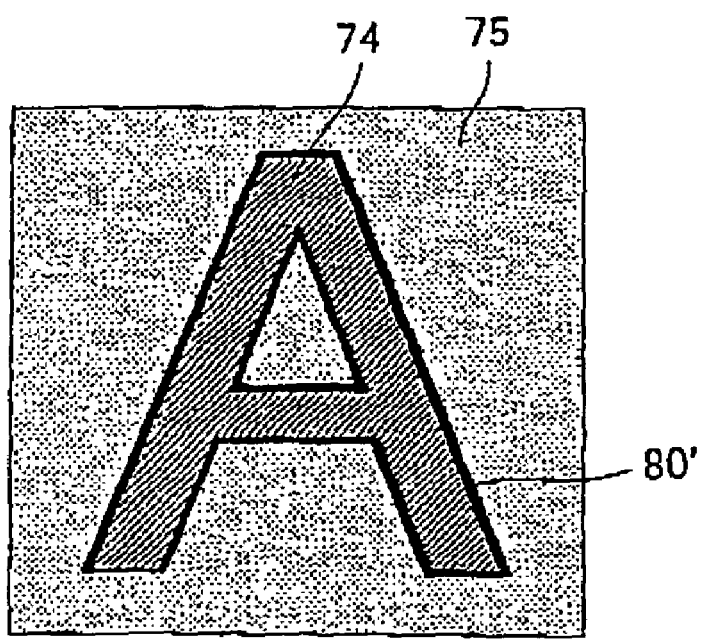
FIG. 8 is an explanatory diagram showing another example of image data obtained by a borderline process (black borderline process)

FIG. 8 shows another example in which image data is formed of the text data 74 and graphics data 75 that are both light colors. For example, the text data 74 is a light red and the graphics data 75 a light green. The text data 74 and graphics data 75 would still be difficult to distinguish even if the white borderline 80 were formed in at least one of the border areas 74a and 75a. Accordingly, in S8, another type of borderline process is executed in S8 to form a black borderline 80' on either one or both of the border areas 74a and 75a. With this process, the text and graphics can be clearly separated, making it easy for even people with color blindness to distinguish the text data 74 from the graphics data 75. Further, since the border area 74a and/or 75a is formed in black, the text 74 and the graphics 75 with high levels of brightness can be clearly distinguished. The number of dots required to form the black borderline 80' is selected to suit the resolution of the color laser printer 1.

It is noted that the brightness-determining program using the equation (5) as described above is also used to determine whether colors of the text 74 and the graphics 75 are dark colors. For example, if the pixels in the two images 74 and 75 both have brightness levels X of greater than or equal to a predetermined value (128), then both are determined to be light colors and the borderline process is executed to form the black borderline 80' described above.

In the above description, a black borderline is formed in the bordering area of at least one of the two adjacent color regions when the brightness levels X of the two adjacent color regions is greater than or equal to the prescribed value (128, for example), while a white borderline is formed in the bordering area of at least one of the two adjacent color regions when the brightness levels X of the two adjacent color regions is less than or equal to the other prescribed value (127, for example). Hence, the bordering area is made clearly distinguishable from the brightness of the two color regions, thereby forming images that are easily readable by people with color blindness.

In the above description, in the process of S8, at least one of the border areas 74a and 75a of the two adjacent color regions 74 and 75 is changed to either white or black based on the brightness of the two adjacent color regions 74 and 75. However, this color blindness image-enhancement process of S8 may be modified to change the brightness or color hue of at least one of the border areas 74a and 75a based on the brightness of the two adjacent color regions 74 and 75, or change the brightness or color hue of at least one of the entire text 74 and the entire graphics data 75 based on the brightness of the two adjacent color regions 74 and 75. These processes can also create image data that are clearly readable by people with color blindness.

Figure 9A:
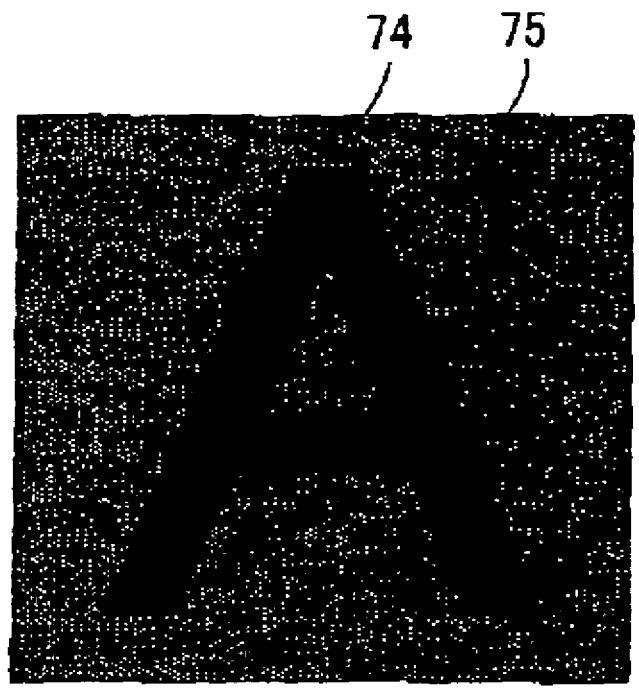
FIG. 9(a) is an explanatory diagram showing an example of original image having text data and graphics data both with dark colors.
Figure 9B:
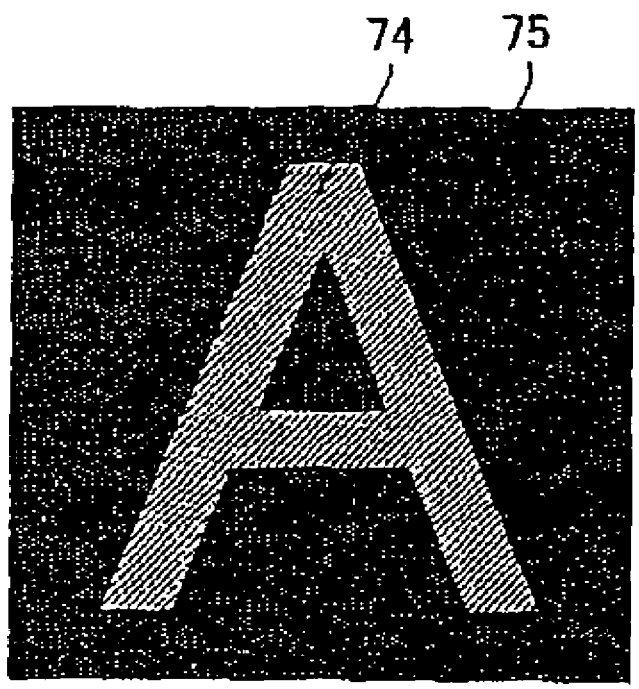
FIG. 9(b) is an explanatory diagram showing an example of image data obtained after adjusting the brightness level of text data in FIG. 9(a)

As a specific example, FIG. 9(a) shows image data formed of the text data 74 and graphics data 75 in dark colors. In this example, the text data 74 is a dark red and the graphics data 75 a dark green. FIG. 9(b) shows the image data after converting the entire text data 74 from a dark red to a light red color in S8. This modification provides contrast in the bordering area between the text data 74 and graphics data 75. In other words, by changing the brightness of image data for at least one of the two adjacent color regions 74 and 75 that are difficult to distinguish by people with color blindness, this process enables people with color blindness to distinguish those color regions easily through the difference in brightness levels.

Figure 10A:
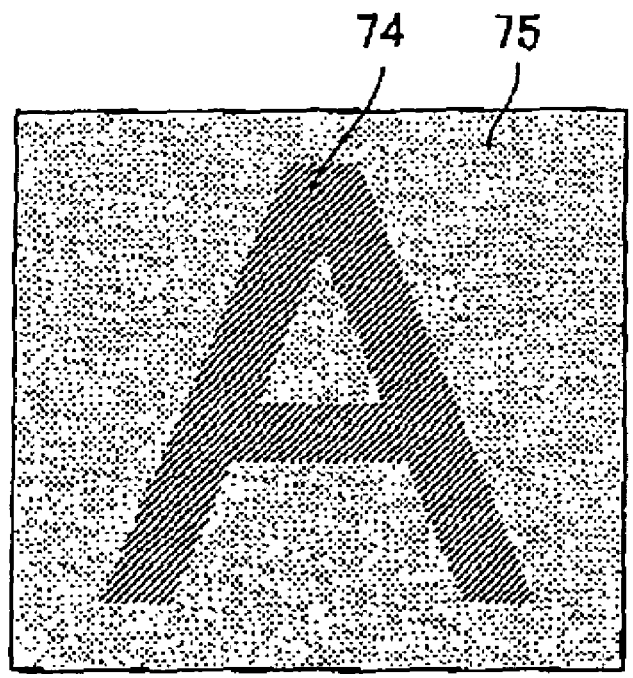
FIG. 10(a) is an explanatory diagram showing an example of original image having text data and graphics data both with light colors.
Figure 10B:
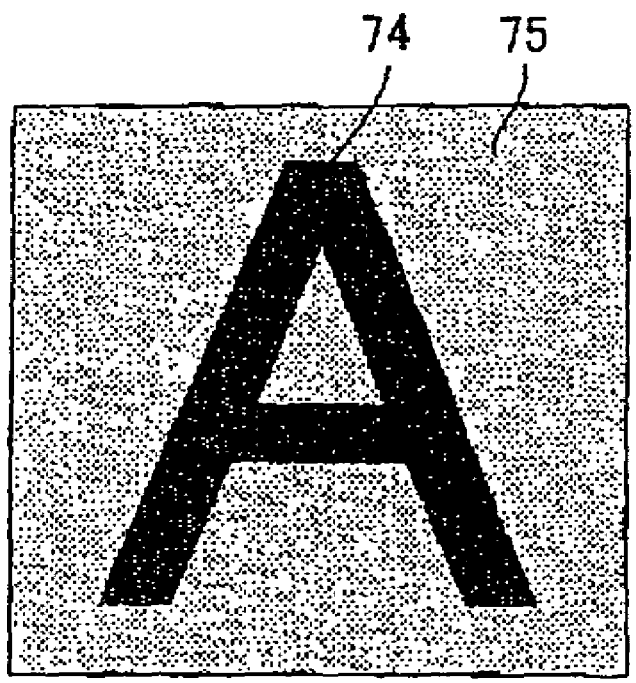
FIG. 10(b) is an explanatory diagram showing an example of image data obtained after adjusting the hue of text data in FIG. 10(a)

FIG. 10(a) shows image data formed of the text data 74 and graphics data 75 in light colors. In this example, the text data 74 is a light red and the graphics data 75 a light green FIG. 10(b) shows the image data after converting the text data 74 from a light red to a dark color (a dark blue, for example) that is different from a light red or light green. This modification provides contrast in the bordering area between the text data 74 and graphics data 75 In other words, by changing the hue of image data for one of the two adjacent color regions 74 and 75 that are difficult to distinguish by people with color blindness, this process can form two adjacent color regions that are easy to distinguish by people with color blindness through the difference in hues.

Figure 11A:
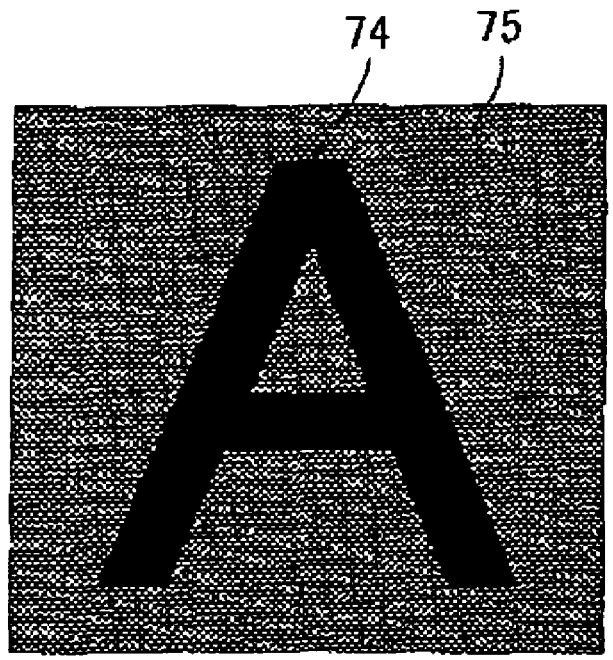
FIG. 11(a) is an explanatory diagram showing an example of original image having text data and graphics data both with dark colors.
Figure 11B:
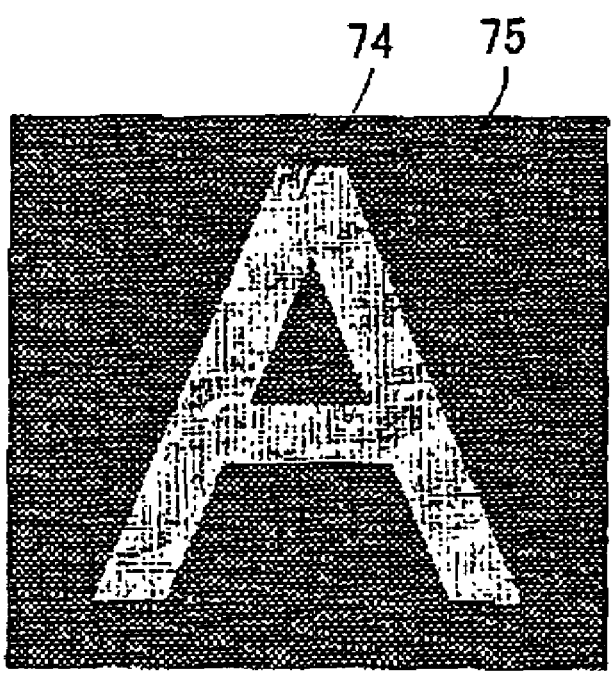
FIG. 11(b) is an explanatory diagram showing an example of image data obtained after adjusting the hue, more specifically, yellow value of text data in FIG. 11(a)

Further, rather than changing the hue of one of the two adjacent color regions 74 and 75 to a color completely different from the original colors, it is possible to simply change the yellow value in the color of the one color region 74 or 75. As a specific example, FIG. 11(a) shows image data formed of dark-colored text data 74 and graphics data 75. For example, the text data 74 is a dark red color and the graphics data 75 a dark green. FIG. 11(b) shows the image data after modifying the hue of the text data 74 by increasing the amount of yellow in the color of the text data 74 in S8. This modification increases the brightness of the text data 74, providing more contrast to the bordering area between the text data 74 and graphics data 75. Accordingly, image data of the two adjacent color regions 74 and 75 can be more easily distinguished than prior to modifying the yellow value, thereby forming the two image regions 74 and 75 that can easily be distinguished by people with color blindness.

In the examples of FIGS. 9(a), 9(b), 10(a), 10(b), and 11(a), 11(b), one of the brightness, hue, and yellow values is modified for the entire text data 74. However, it is possible to modify at least two of these values for the entire text data 74.

Additionally, it is possible to modify at least one of the brightness, hue, and yellow values for the entire graphics data 75, to modify these values for both of the entire text data 74 and the entire graphics data 75, or to modify these values for only data for at least one of the border areas 74a and 75a of the text 74 and the graphics 75.

Rather than changing the text data 74 from a dark color to a light color in FIG. 9(b), it is also possible to modify the graphics data 75 from a dark color to a light color. Further, rather than changing the text data 74 from a light color to a dark color in FIG. 10(b), it is possible to modify the graphics data 75 from a light color to a dark color.

In FIG. 11(b), the yellow value of the text data 74 is increased. However, it is also possible to increase the yellow value of the graphics data 75. It is also possible to decrease the yellow value of either one or both of the text data 74 and the graphics data 75.

It is noted that the above description is given mainly for the example when images are processed to be easy to read for people with protano(pia/malous) and deuterano(pia/malous). However, processes similar to those described above can be applied to create images aimed at people with tritanopia and trizanomalous, as well.

<Modification>

It is noted that in the above description, in S4, first the text-graphics existence judging program and the text-graphics overlap judging program are executed. When it is determined that text and graphics overlap in the image, the color-image extracting program is executed to examine colors of those pixels that are located in the text data and the graphics data, thereby examining whether the bordering area between the text data and the graphics data is difficult to distinguish. When the bordering area is determined as difficult to distinguish, an image region including the text data, the graphics data, and their bordering area is extracted as a region difficult to distinguish. Then, in S8, the brightness, hue, or yellow value of at least the border area of at least one of the text data and the graphics data is processed.

However, the text-graphics existence judging program or the text-graphics overlap judging program may not be executed. In such a case, in S4, the color-image extracting program examines colors of pixels in the entire image and to judge whether some neighboring pixels, whose colors are in the target color combination and whose brightness are similar to each other, exist in the entire image. If some neighboring pixels, whose colors are in the target color combination and whose brightness are similar to each other, exist in the entire image, it is known that there exist two color regions of the target color combination that are located next to each other and that are difficult to distinguish. An image area including these two color regions is extracted as an image region difficult to read. In S8, the brightness, hue, or yellow value of at least the border area of at least one of the two image regions is processed.

<Another Modification>

During the extracting process of S4, a reddish-color small-area portion may also be extracted from the entire image because the reddish-color small-area portion is also difficult to distinguish from surrounding image. The brightness, hue, or yellow value of at least the border of the red-type-color small-area portion is processed in S8. The brightness, hue, or yellow value of at least the border of an area surrounding the red-type-color small-area portion may be processed, instead.

Second Embodiment

Next, a second embodiment of the present invention will be described below with reference to FIGS. 12-17(b).

The second embodiment differs from the first embodiment in the display contents of the Color Blindness dialog box 66 and in the page process (image processing process) for printing.

Figure 12:
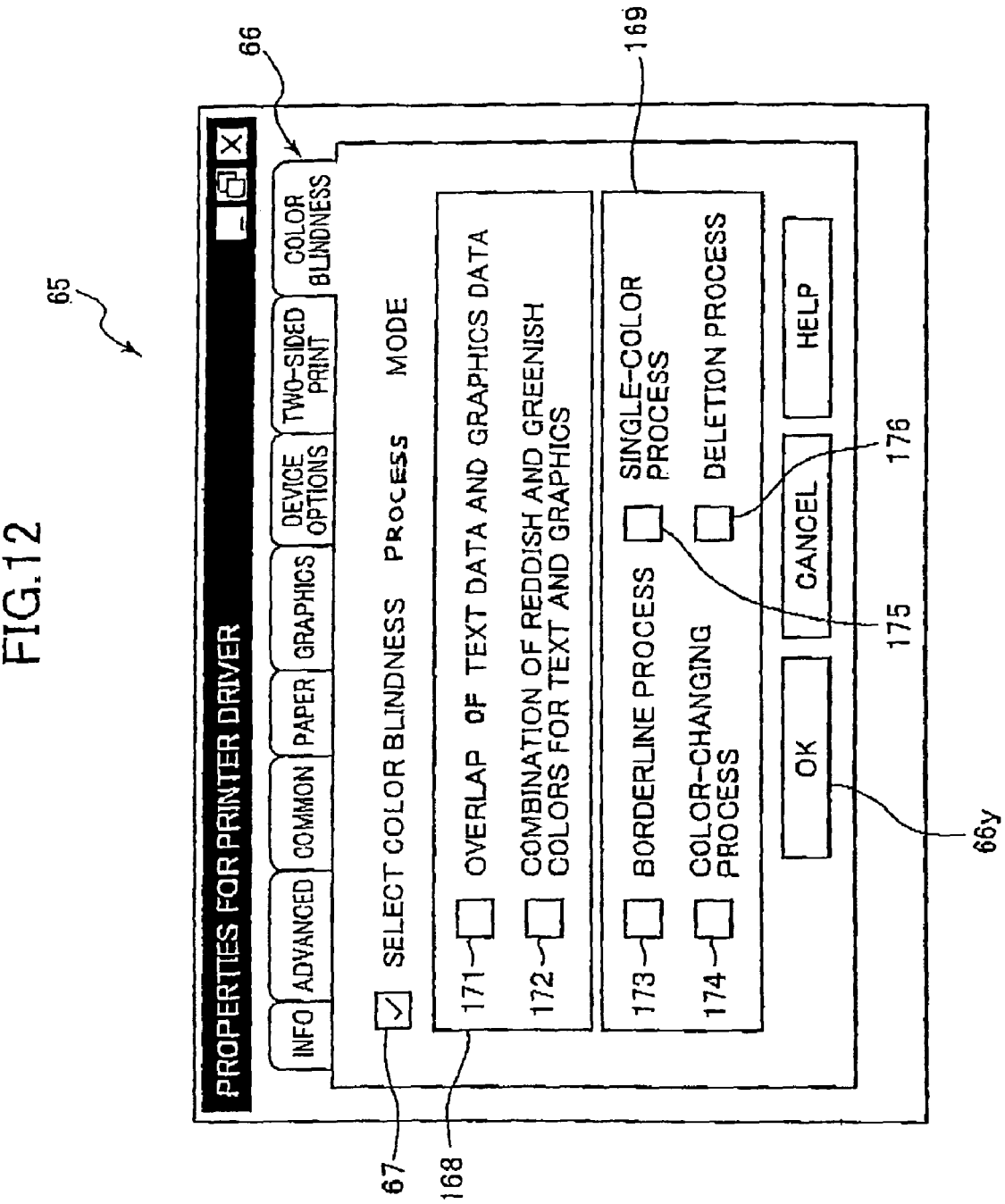
FIG. 12 is an explanatory diagram showing a Properties window for a printer driver according to a second embodiment.

According to the present embodiment, as shown in FIG. 12, the color blindness dialog box 66 includes the color blindness process mode checkbox 67 similarly to the first embodiment (FIG. 4). However, the color blindness dialog box 66 does not contain the color blindness type setting box 68 or the color blindness degree setting box 69 of the first embodiment, but includes an image processing objective setting box 168 and an image processing method setting box 169.

The image processing objective setting box 168 enables the user to set conditions for a target of the color blindness image-enhancement process. More specifically, the image processing objective setting box 168 includes the selection "overlap of text data and graphics data" and "combination of reddish and greenish colors for text and graphics." The "overlap of text data and graphics data" is selected in order to execute the color blindness image-enhancement process when text data and graphics data included in the image data overlap. The "combination of reddish and greenish colors for text and graphics" is selected in order to execute the color blindness image-enhancement process when the colors of the text data and the graphics data in the image data form the specific combination, that is, when either the text or graphics data is a reddish color and the other is a greenish color. Checkboxes 171 and 172 corresponding to these selections are also provided.

For example, if a checkbox 171 next to the "overlap of text data and graphics data" selection is checked, the color blindness image-enhancement process is executed only when text and graphics data overlap. In order to determine whether text and graphics data overlap, the text-graphics overlap judging program using the equation is executed in the same manner as in the first embodiment. By checking a checkbox 172 next to the "combination of reddish and greenish colors for text and graphics" selection, the user can select to execute the color blindness image-enhancement process only when one of either the text data or graphics data color is a reddish color while the other is a greenish color. In order to determine whether one of the text data or graphics data colors is a reddish color while the other is a greenish color, the color-determining program using the inequalities (1)-(4) is executed onto all the pixels in the text data and the graphics data in the same manner as in the First embodiment.

If the text data is classified as a red color and the graphics data as a green color or if the text data is classified as a green color and the graphics data as a red color in this determination, then one of the text data and graphics data colors is determined to be a red color while the other is determined to be a green color.

In the image processing objective setting box 168, the user can select either the checkbox 171 or the checkbox 172 or can select both the checkbox 171 and the checkbox 172. When the user selects both the checkbox 171 and the checkbox 172, then the color blindness image-enhancement process is executed only when the text data overlaps the graphics data and one of the text data and graphics data is a red color while the other is a green color.

By selecting the checkbox 171 next to the "overlap of text data and graphics data" selection, the color blindness image-enhancement process is executed to enable people with color blindness to distinguish text within graphics, even when the text and graphics overlap each other on the paper 3. Moreover, by selecting the checkbox 171, the color blindness image-enhancement process is not executed when the text data and graphics data do not overlap. Hence, the image processing process can achieve an efficient image process by avoiding excess processing.

By selecting the checkbox 172 next to the "combination of reddish and greenish colors for text and graphics," the color blindness image-enhancement process is executed to enable people with color blindness to distinguish text within a mixture of text and graphics on the paper 3, ever when the colors of the text and graphics data are the specific combination. Moreover, by selecting the checkbox 172, the color blindness image-enhancement process is not executed when the colors of the text data and graphics data are not the specific combination. Hence, the mage processing process can achieve an efficient image process by avoiding excess processing.

By selecting the checkbox 172, when one of the text data and graphics data colors is a red color and the other a green color, the color blindness image-enhancement processing makes text formed on the paper 3 distinguishable to people with protano(pia/malous) and deuterano(pia/malcus) which accounts for the majority of people with color blindness.

The image processing method setting box 169 includes a plurality of checkboxes for setting a plurality of image processes for color blindness. More specifically, the image processing method setting box 169 includes checkboxes enabling the user to select such settings as a "borderline process" for processing the outlines of text data included in the image data, a "color-changing process" for modifying the color of text data included in the image data, a "single-color process" for converting graphics data included in the image data to a single-color and single-tone graphics data, and a "deletion process" for deleting the graphics data included in the image data.

For example, the user can select a borderline process described later to be executed as the color blindness image-enhancement process by checking a checkbox 173 next to "borderline process." The user can select a color-changing process described later to be executed as the color blindness image-enhancement process by checking a checkbox 174 next to "color-changing process." The user can select a single-color process described later to be executed as the color blindness image-enhancement process by checking a checkbox 175 next to "single-color process." The user can select a deletion process described later to be executed as the color blindness image-enhancement process by checking a checkbox 176 next to "deletion process."

While in general the user selects one process in the image processing method setting box 169, in some cases the user may select a combination of the "borderline process" or "color-changing process" and the "single-color process," or a combination of the "borderline process" or "color-changing process" and the "deletion process," for example. In other words, it is possible to select suitable combinations of processes for text data ("borderline process" and "color-changing process") and processes for graphics data ("single-color process", and "deletion process").

After the user completes settings in the color blindness dialog box 66, including the selection of the color blindness process mode, selections in the image processing objective setting box 168, and selections in the image processing method setting box 169, the user clicks on an OK button 66y provided in the color blindness dialog box 66. At this time, data for the above selections is stored in the NVRAM 55 of the CPU 52 The data stored in the NVRAM 55 can be modified at any time by displaying the color blindness dialog box 66. After modifying the data, the modified data is stored in the NVRAM 55. By storing this data in the NVRAM 55, it is possible to eliminate the steps required for selecting and inputting this data over and over when repeatedly using the same data for specific people with color blindness.

Next, the page process according to the present embodiment will be described with reference to FIG. 13.

Figure 13:
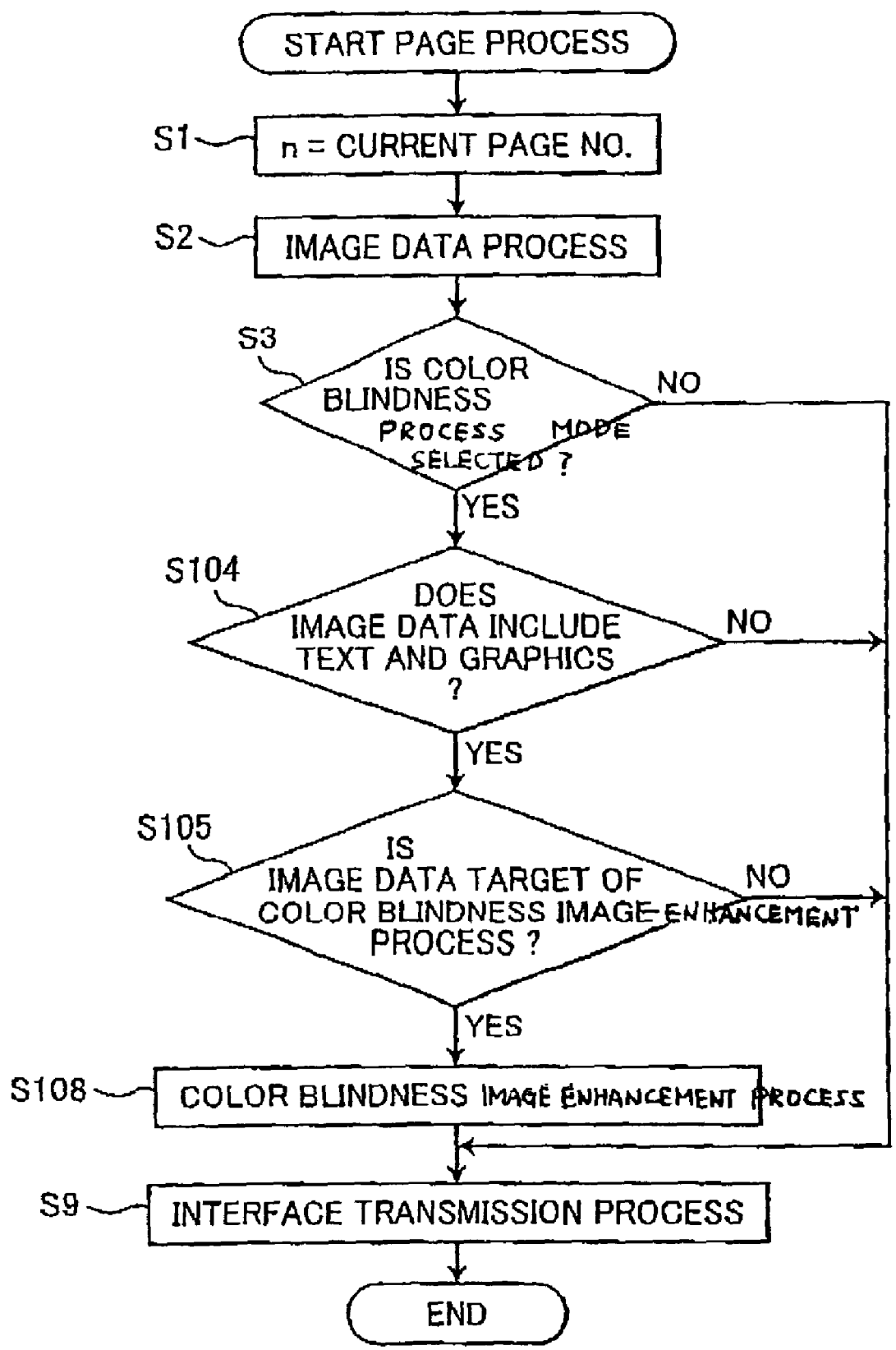
FIG. 13 is a flowchart showing the page process according to the printer driver of the second embodiment.

As shown in FIG. 13, the page process of the present embodiment is different from that of the first embodiment in that processes of S104, S105, and S108 are provided in place of the processes of S4-S8 of the first embodiment (FIG. 5)

According to the present embodiment, when the color blindness process mode has been selected (S3: YES), that is, when the user has checked the color blindness process mode checkbox 67 in FIG. 12, then the process for the color blindness process mode is started. In S104. In S104, the text-graphics existence judging program is executed to determine whether the image data includes both of text data and graphics data.

If the image data does not Include text data or graphics data (that is, if the image data includes only text data or only graphics data; S104: NO), then in S9 the interface transmission process is executed in the normal print mode without performing the color blindness image-enhancement process.

On the other hand, when the image data includes both text data and graphics data (S104: YES), then the program proceeds to S105. In 5105, it is determined whether the image data is the type of image data selected in the image processing objective setting box 168, that is, whether the image data is the target of the color blindness image-enhancement process.

For example, when both of the checkbox 171 and the checkbox 172 have been checked, only when the text data and graphics data overlap and one of the text data and graphics data is a red color while the other is a green color (S105: YES), the color blindness image-enhancement process is executed in 5108. However, when both the checkbox 171 and the checkbox 172 have been checked, if the text data and graphics data do not overlap at any area or the text and graphics data do not follow the color combination of one being red and the other green (S105: NO), then the process proceeds directly to S9, in which the interface transmission process is performed in the normal print mode without executing the color blindness image-enhancement process.

If the image data is determined to be the target of the color blindness image-enhancement process in the above determination (S105: YES), then the program proceeds to S108. In S108, the color blindness image-enhancement process is executed in a manner set by the image processing method setting box 169. When the checkbox 173 next to the "borderline process" has been checked in image processing method setting box 169, for example, in S108 the borderline process is executed on text data in the image data as the color blindness image-enhancement process. Hence, when the image data is determined to be the target of the color blindness image-enhancement process (yes in S105), this process is executed to enable people with color blindness to distinguish the text even when text and graphics are mixed on the paper 3.

Figure 14A:
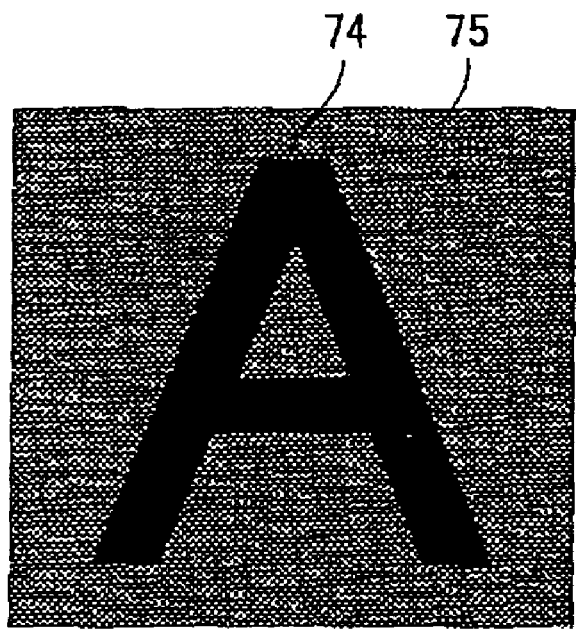
FIG. 14(a) is an explanatory diagram showing an example original image.
Figure 14B:
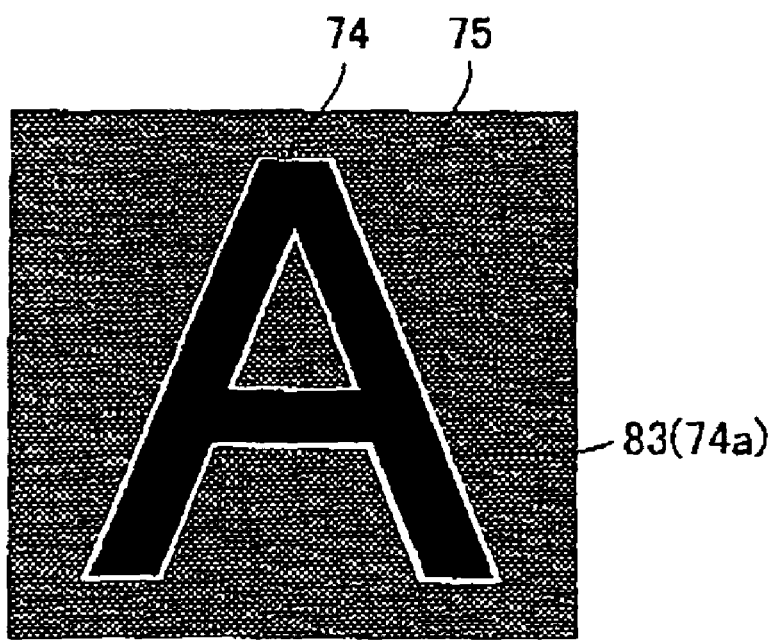
FIG. 14(b) is an explanatory diagram showing an image obtained through a borderline process.

More specifically, as shown in FIG. 14(*a*), when the coordinates of text data 74 and graphics data 75 overlap and the text data 74 is a red color while the graphics data 75 is a green color, then the borderline process converts the text data 74 into processed text data 74 with an outline part 83 as shown in FIG. 14(*b*). That is, the border area 74a (FIG. 6(*b*)) of the text data 74 is converted into white outline data 83. This conversion is performed by a method well known in the art for converting text data into an outline font.

In this way, bordering areas between the text data 74 and graphics data 75 that are difficult to distinguish by people with color blindness are converted to images that can be distinguished by people with color blindness through an easy and quick process. As a result, people with color blindness can easily and clearly distinguish text with borderlines formed on the paper 3. Even people with no color blindness can easily and clearly distinguish text with borderlines formed on the paper 3.

Thus, according to the present embodiment, the color blindness dialog box 66 includes the color blindness process mode checkbox 67, the image processing objective setting box 168 and the image processing method setting box 169. If the user selects checkboxes 171 and 172, then text data 74 is converted to an outline text when coordinates of the text data 74 and a graphics data 75 overlap and when the text data 74 is a red color while the graphics data 75 is a green color In this way, even though text and graphics are mixed in the image, text is processed by the printer drive 64 simply in a short period of time into such a state that is easy to distinguish from the graphics.

When the checkbox 174 next to the "color-changing process" is checked in the image processing method setting box 169, then in S108 a color-changing process is executed as the color blindness image-enhancement process for changing the color of text data in the image data.

Figure 15A:
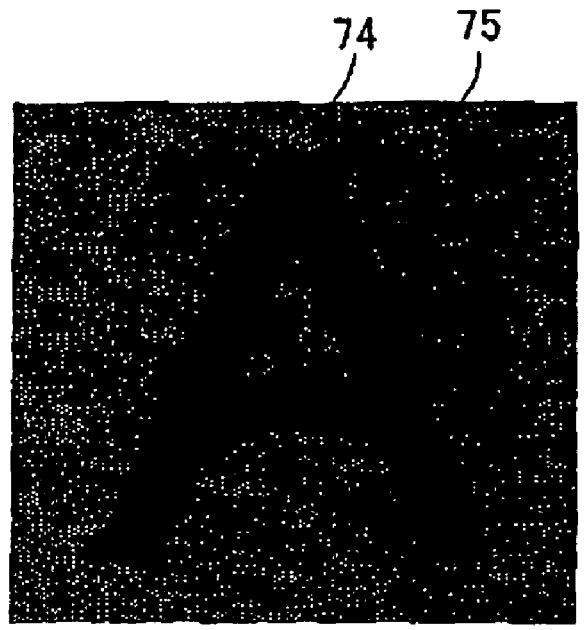
FIG. 15(a) is an explanatory diagram showing an example original image.
Figure 15B:
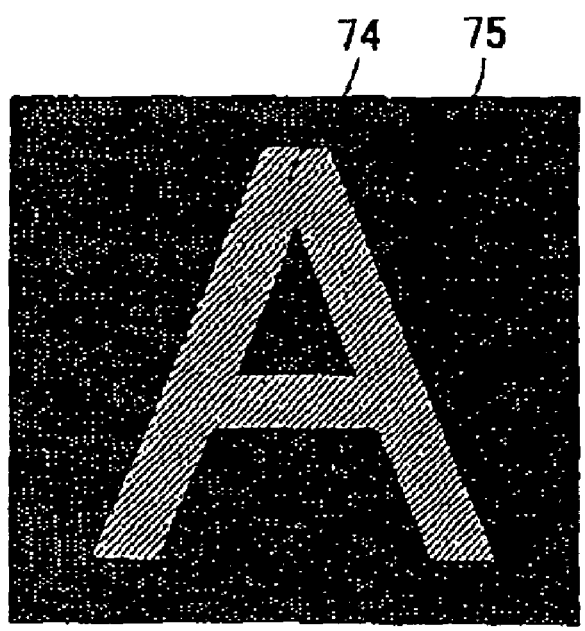
FIG. 15(b) is an explanatory diagram showing an image obtained through a color-changing process.

For example, when the coordinates of the text data 74 and graphics data 75 overlap and the text data 74 is a red color while the graphics data 75 is a green color as shown in FIG. 15(*a*), then the color-changing process is performed to convert the color of the text data 74 to a color different from both of the original color of the text 74 and the color of the graphics 75 as shown in FIG. 15(*b*).

More specifically, when for example the image data includes dark red text data 74 and dark green graphics data 75, then the color-changing process is executed to convert the color of the text data 74 to a yellow color. If the image data includes light red text data 74 and light green graphics data 75, then the color-changing process is executed to convert the color of the text data 74 to a blue color.

It is noted that the darkness or lightness of colors in the text data 74 and the graphics data 75 is determined from the level of brightness in pixels making up the text data 74 and the graphics data 75. The brightness of the pixels are determined by executing the brightness-determining program using the formula (5) in the same manner as in the first embodiment. The color is determined to be a dark color when the determined brightness level is 127 or less, for example. The color is determined to be light color when the brightness level is 128 or greater, for example.

Since the color of the text data 74 is converted to a different color in this way, areas in the border portion between the text data 74 and graphics data 75 that are difficult to distinguish by people with color blindness are converted to images that can easily be distinguished by people with color blindness. As a result, people with color blindness can easily and clearly distinguish text formed on the paper 3 in a different color.

Figure 16A:
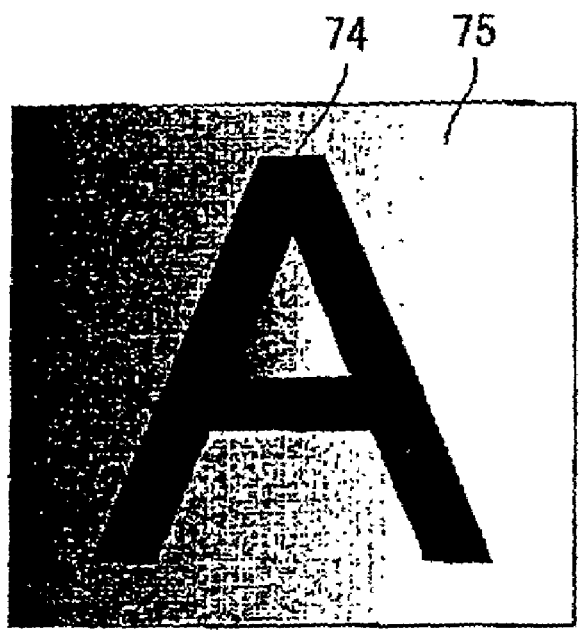
FIG. 16(a) is an explanatory diagram showing an example original image.
Figure 16B:
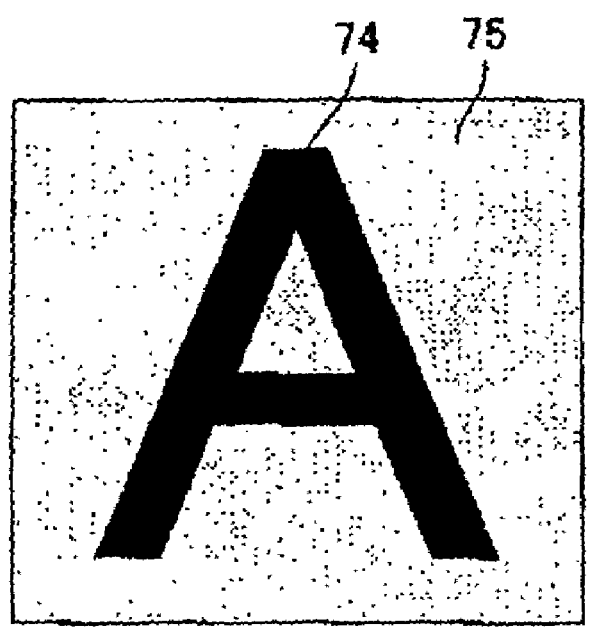
FIG. 16(b) is an explanatory diagram showing an image obtained through a single-color process.

Further, when the checkbox 175 next to the "single-color process" is checked in the image processing method setting box 169, then in S108 a single-color process is executed as the color blindness image-enhancement process to convert the colors of the graphics data 75 in the image data to a single color. As shown in the example of FIG. 16(*a*), when the coordinates of the text data 74 and graphics data 75 overlap, the text data 74 is a red color and the graphics data 75 a green color, and the graphics data 75 has a gradation (distribution of a plurality of different tones) or a multicolored pattern (distribution of a plurality of different colors), then the single-color process converts the color of the graphics data 75 to a single color with a single tone whose color and tone is the average value of the darkest color and the lightest color In the graphics data 75 as shown in FIG. 16(*b*).

By converting the color of the graphics data 75 to a single-color and single-tone in this way, even if the graphics data 75 has gradation or a multicolor pattern, for example, areas that are difficult to distinguish by people with color blindness in the borders between the text data 74 and graphics data 75 are converted to images that can be easily distinguished by people with color blindness. As a result, the image processing process enables people with color blindness to distinguish texts in graphics formed on the paper 3.

Figure 17A:
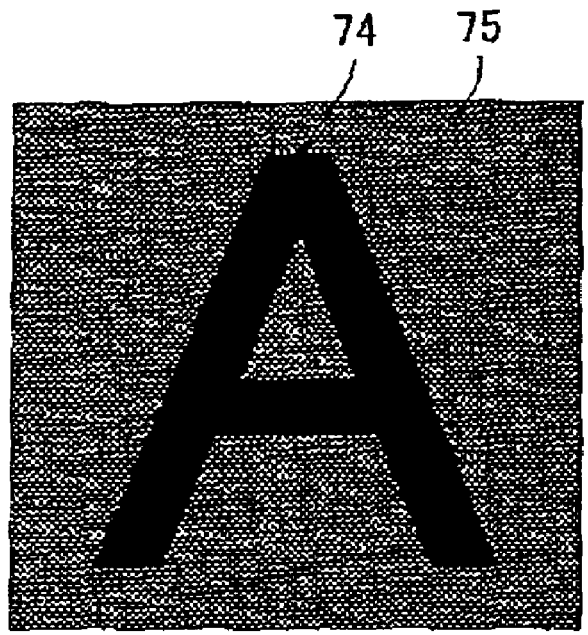
FIG. 17(a) is an explanatory diagram showing an example original image.
Figure 17B:
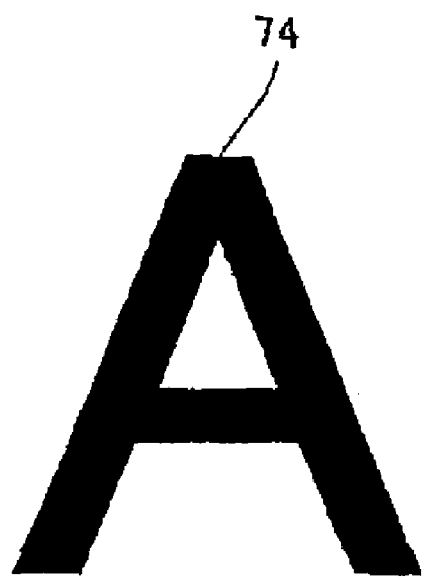
FIG. 17(b) is an explanatory diagram showing an image obtained through a deletion process.

Further, when the checkbox 176 next to the "deletion process" is checked in the image processing method setting box 169, then in S108 a deletion process is executed as the color blindness image-enhancement process for deleting the graphics data 75 in the image data. For example, as shown in FIG. 17(*a*), when coordinates of the text data 74 and graphics data 75 overlap and when the text data 74 is a red color and the graphics data 75 a green color, the deletion process deletes the graphics data 75 as shown in FIG. 17(*b*).

By deleting the graphics data 75 in this way, border areas between the text data 74 and graphics data 75 that are difficult to distinguish by people with color blindness can be converted to an image that can be distinguished by people with color blindness. As a result, the image processing process can reduce consumption of toner used for the graphics data 75 and can enable people with color blindness to clearly distinguish text formed on the paper 3.

After image data in regions that are difficult to distinguish by people with color blindness is processed in S108 into image data that can be distinguished by people with color blindness according to the above described processes, in S9 the interface transmission process is executed.

In the above description, the borderline process is performed on the border area 74*a* of the text data 74 as shown in FIG. 14(*b*). However, the borderline process may be performed on the border area 75*a* (FIG. 6(*b*)) of the graphics data 75, instead.

In the above description, the color-changing process converts the color of the text data 74 to a color different from the colors of the text data 74 and the graphics data 75. However, this process can convert the color of the graphics data 75 to a color different from the colors of the text data 74 and the graphics data 75, instead.

If the checkbox 172 is checked but the checkbox 171 is not checked, the judgment of S105 is made affirmative (yes in S105) if the text data and the graphics data in the image are in the red and green color combination even if the text data and the graphics data are not overlapped with each other. By executing the color blindness image-enhancement process of S101 onto such text data and the graphics data, it is still possible to enable people with color blindness to easily distinguish the text data and the graphics data that are located in the image.

Third Embodiment

Next, a third embodiment of the present invention will be described below with reference to FIGS. 18-24(*b*).

The third embodiment differs from the first embodiment also in the display contents of the Color Blindness dialog box 66 and in the page process (image processing process) for printing.

Figure 18:
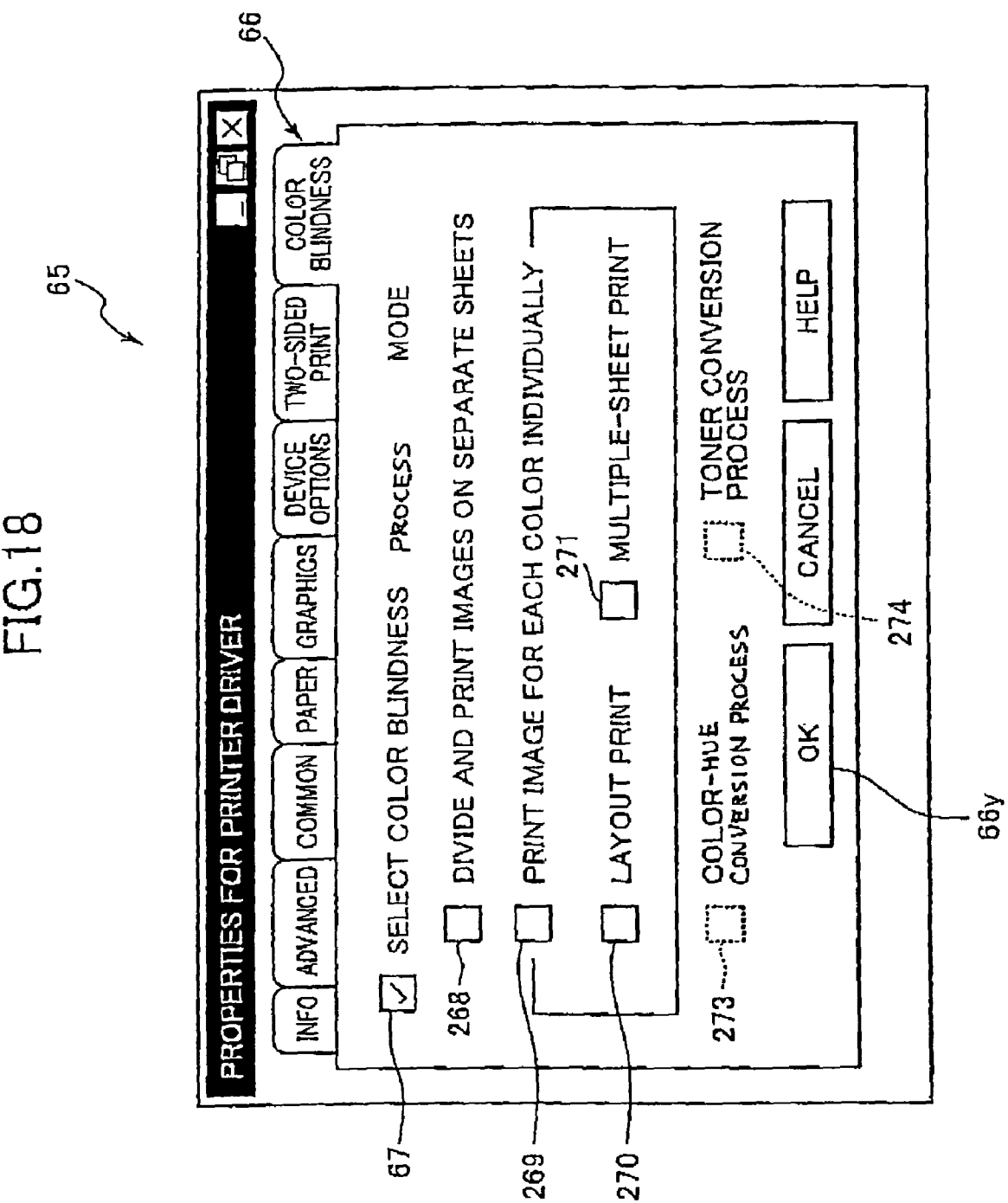
FIG. 18 is an explanatory diagram showing a Properties window for a printer driver according to a third embodiment.

According to the present embodiment, as shown in FIG. 18, the color blindness dialog box 66 includes the color blindness process mode checkbox 67 similarly to the first embodiment (FIG. 4). However, the color blindness dialog box 66 does not contain the color blindness type setting box 68 or the color blindness degree setting box 69 of the first embodiment, but includes a divided print setting box 268 for selecting whether to print color images cn separate sheets of the paper 3 according to color divisions, and an individual color print setting box 269 for selecting whether to print an image for each color.

The divided print setting box 268 enables the user to select a divided print process for dividing a color image into images of some colors making up the color image and images of other colors and printing the divided color images on separate sheets of the paper 3.

More specifically, when the divided print setting box 268 is checked, a printing process described later is set. In this printing process, an image for one color (yellow) in the color image is printed on a transparency as the first image, while an image of another color (the remaining three colors cyan, magenta, and black) is printed on normal paper as the second image.

The individual color print setting box 269 enables the user to select an individual color printing process, wherein images for individual colors making up the color image are printed individually.

More specifically, the individual color print setting box 269 includes checkboxes 270, 271 corresponding to a "layout print" for printing each image on a single sheet of normal paper and a "multiple-sheet print" for printing the images on a plurality of sheets of normal paper. For example, when a checkbox 270 for "layout print" is checked, a layout printing process is selected for laying out and printing a single-color image for each color and a full-color image with all colors on a single sheet of the paper 3 in the printing process described later. When a checkbox 271 next to the "multiple-sheet print"

is checked, for example, a multiple sheet printing process is selected for printing a single-color image for each color and a full-color image with all colors on separate sheets of the paper 3 in the printing process described later. In other words, three single-color-component images (cyan image, magenta image, and yellow image) for the original full-color image and the original full-color image are printed on a single sheet of paper through the layout print process, and the same images are printed individually on separate sheets through the multiple-sheet print process.

The color blindness process mode is set such that only one of the divided print setting box 268 and the individual color print setting box 269 can be checked, forcing the user to select either the divided printing process or the individual color printing process. The individual color printing process is set such that only one of the checkbox 270 next to the "layout print" and the checkbox 271 next to the "multiple-sheet print" can be checked, forcing the user to select between the layout printing process and the multiple-sheet printing process.

After checking the desired color blindness process mode checkbox 67, divided print setting box 268, individual color print setting box 269, checkbox 270, and checkbox 271, the user clicks an OK button 66y provided in the color blindness dialog box 66. At this time, the selection for the color blindness process mode and data regarding printing processes inputted in the divided print setting box 268 and individual color print setting box 269 are stored in the NVRAM 55 of the CPU 52. Data stored in the NVRAM 55 can be modified at any time by displaying the color blindness dialog box 66. After modifying this data, the modified data is stored in the NVRAM 55. By storing this data in the NVRAM 55, it is possible to eliminate the steps required for selecting and inputting data time after time when the same data is used repeatedly for a specific individual with color blindness.

Next, the page process according to the present embodiment will be described with reference to FIG. 19.

Figure 19:
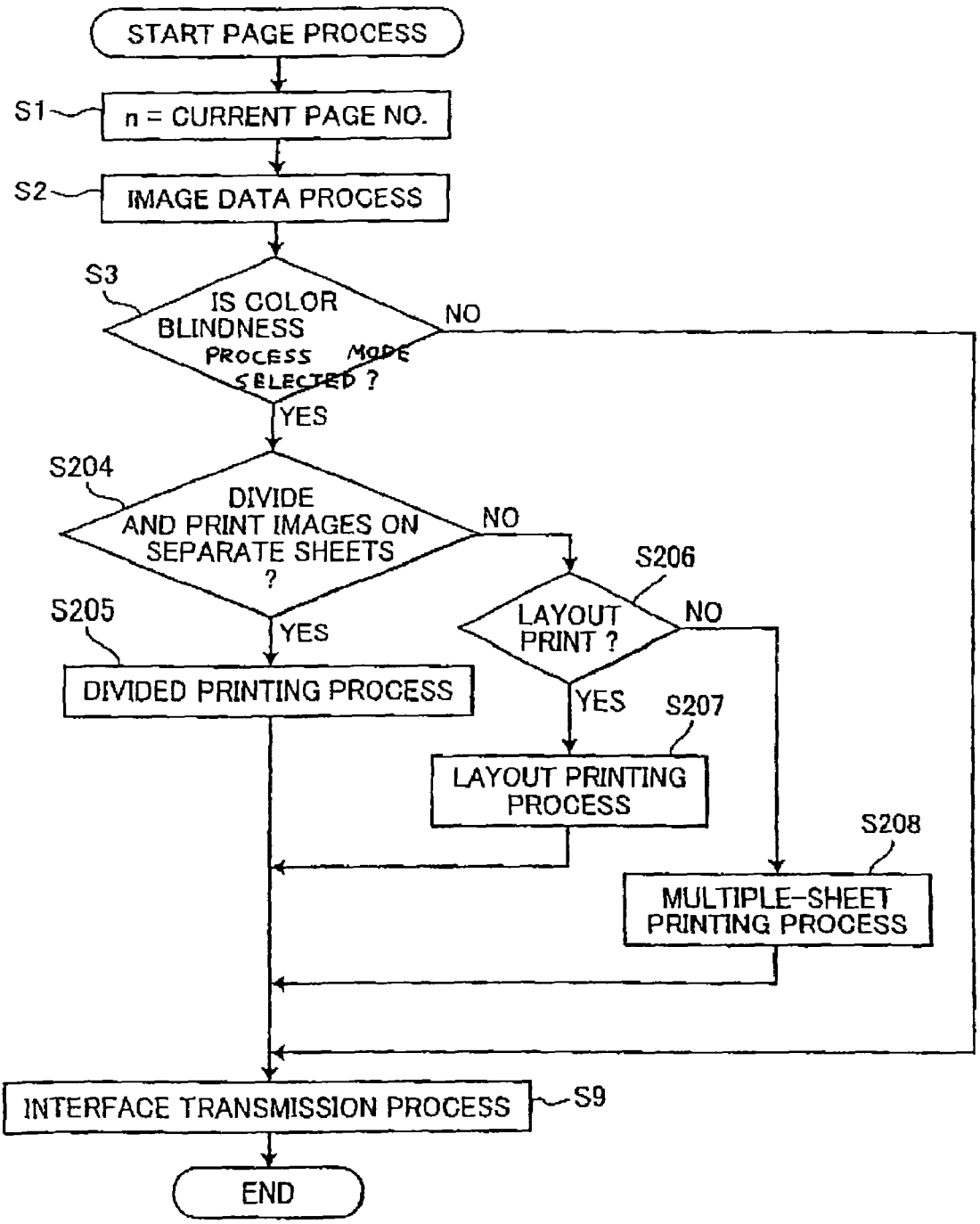
FIG. 19 is a flowchart showing the page process according to the printer driver of the third embodiment.

As shown in FIG. 19, the page process of the present embodiment is different from that of the first embodiment in that processes of S204-S208 are provided in place of the processes of S4-S8 of the first embodiment (FIG. 5).

According to the present embodiment, during the page process for printing one page's worth of image data indicative of an image, when the color blindness process mode has been selected, that is, when the color blindness process mode checkbox 67 in FIG. 18 has been checked (S3; YES), then in S204 it is determined whether the divided printing process has been selected.

If the divided printing process has been selected, that is, when the divided print setting box 268 is checked (S204: YES), then the divided printing process is executed in S205 and the process proceeds to S9.

In S205, a command to execute the divided printing process for processing the subject set of image data (one page's worth of image data) is crested. The command and the image data are transmitted to the color laser printer 1 through the interface transmission process of S9.

Next, this divided printing operation will be described in more detail.

As shown in FIG. 1, a normal paper 374 is loaded in the paper supply tray 6 and a transparent sheet 373 such as transparency used on overhead projectors or the like is loaded in the fixing unit 20.

When the command to execute the divided printing process and the image data are transmitted to the color laser printer 1 in S9, the color laser printer 1 begins the divided printing operation. At the beginning of this process, the paper supply tray 6 is driven to supply a sheet of the normal paper 374 to the register rollers 10. The image forming unit 5 forms, based on the subject image data, toner images on the intermediate transfer belt 36 in three colors such as magenta, cyan, and black, but excluding yellow. The normal paper 374 is conveyed to the transfer position at a prescribed timing by the driving of the register rollers 10 The toner image of three colors formed on the intermediate transfer belt 36 is transferred to the normal paper 374 supplied to the transfer position as the normal paper 374 passes between the first intermediate transfer member support roller 34 and the transfer roller 18. After the three-colored toner image is formed on the normal paper 374, the toner image is fixed on the normal paper 374 in the fixing unit 20. Subsequently, the discharge rollers 45 discharge the normal paper 374 onto the discharge tray 46. The normal paper 374 is printed with an image 370cmk (first image) formed of three colors of cyan, magenta, and black as shown in FIG. 20(b).

Next, the multipurpose feed roller 13 is driven in order to convey the transparent sheet 373 to the register rollers 10 at a prescribed timing. The image forming unit 5 forms, based on the subject image data, a toner image of only the yellow color, for example, on the intermediate transfer belt 36. The transparent sheet 373 is conveyed to the transfer position at a prescribed timing by the driving of the register rollers 10. The yellow toner image formed on the intermediate transfer belt 36 is transferred onto the transparent sheet 373 supplied to the transfer position as the transparent sheet 373 passes between the first intermediate transfer member support roller 34 and the transfer roller 18. After the yellow toner image is formed on the transparent sheet 373, the toner image is fixed thereon in the fixing unit 20. Subsequently, the discharge rollers 45 discharge the transparent sheet 373 onto the discharge tray 46. The transparent sheet 373 is printed with an image 370y (second image) formed of yellow only as also shown in FIG. 20(b).

As a result, the normal paper 374 printed with the image 370cmk formed of three colors, excluding yellow, and the transparent sheet 373 printed with the image 370y formed of yellow only are set On top of the discharge tray 46. In this way, the normal paper 374 is printed with the CMK-color-component-mixture image 370cmy of the original image, and the transparent sheet 373 is printed with the Y-color component image 370y of the original image. Thus, the image data indicative of the original image is processed by cooperation of the personal computer 51 and the color laser printer 1 into the CMK-color-component-mixture image 371 and the Y-color component image 372 of the original image. The CMK-color-component-mixture image 371 is printed on the normal sheet 374, and the Y-color component image 372 is printed on the transparent sheet 373. In other words, the command to execute the divided printing process created in S205 serves as data indicative of the divided-printing processed images 370y and 370cmk.

Figure 20A:
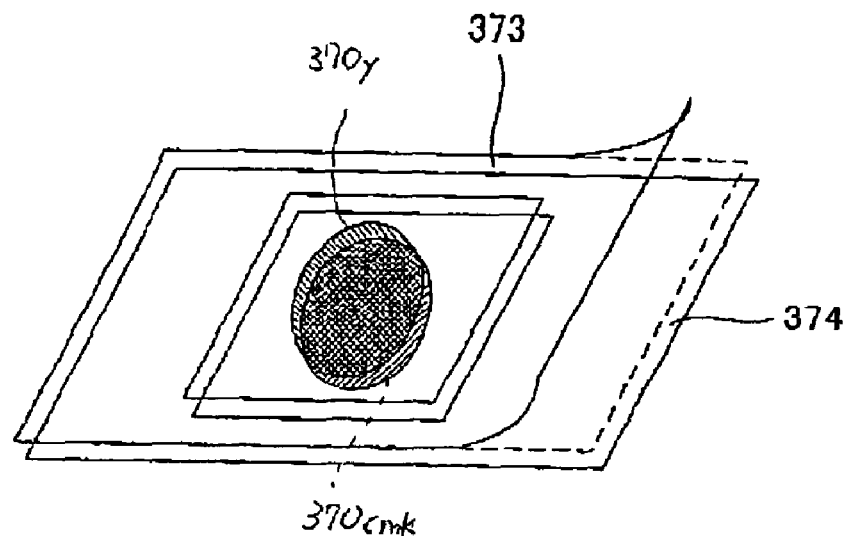
FIG. 20(a) is an explanatory diagram showing a transparency superimposed on a normal sheet of paper, which are obtained through a divided printing process in the process of FIG. 19.
Figure 20B:
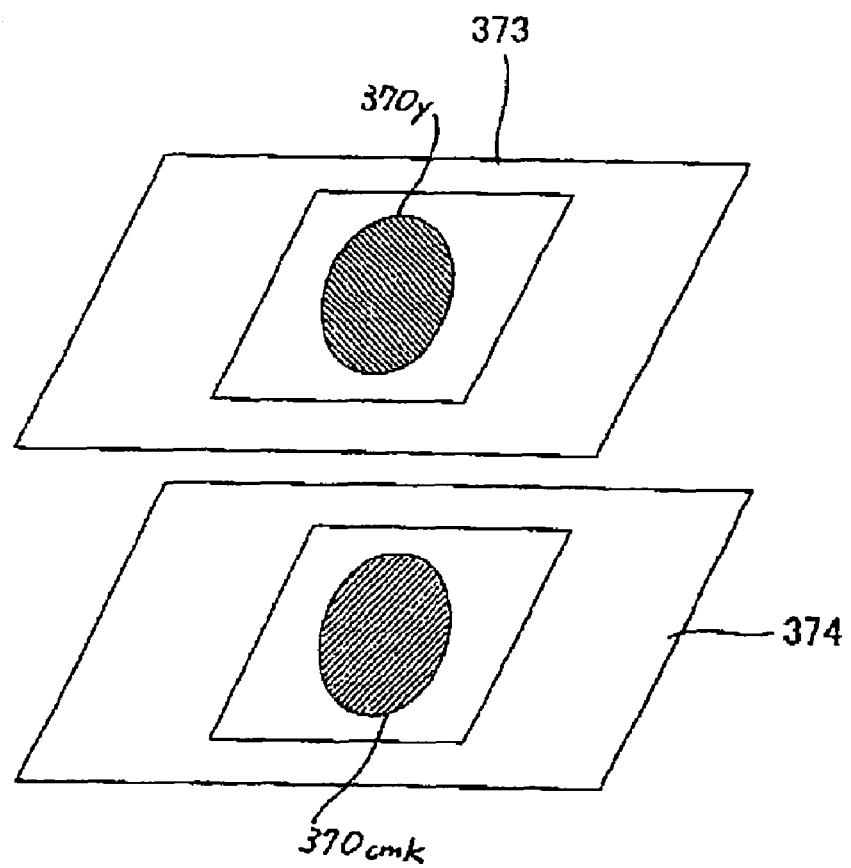
FIG. 20(b) is an explanatory diagram showing the transparency and normal sheet separated.

Accordingly, by placing the transparent sheet 373 with the yellow image 370y over the normal paper 374 with the tri-colored image 370cmk, as shown in FIG. 20(a), and viewing the image from the top of the transparent sheet 373, the user can view a normal full-color image identical to the original image printed on a single sheet of paper in all colors. However, if this printed image includes portions that are difficult to distinguish by people with color blindness, such people can easily distinguish the image by peeling the transparent sheet 373 off the normal paper 374 as shown in FIG. 20(b) and viewing the images 370y and 370cmk separately. Accordingly the divided printing process enables people with color blindness to easily read the original image by viewing both the normal paper 374 and the transparent sheet 373 through a simple process. In other words, by viewing the images 373 and 374, the people with color blindness can easily understand the contents of the images. More specifically, even if the original color image has a plurality of different-color image regions which are located adjacent to one another and which are difficult to distinguish for people with color blindness, by viewing the images 370y and 370cmk on the sheets 373 and 374 separately, the people with color blindness can easily distinguish those color image regions from one another. Further, a normal full-color image can be viewed simply by placing the transparent sheet 373 over the normal paper 374.

Further, in the divided printing process the feed roller 7 supplies a sheet of the normal paper 374 from the paper supply tray 6 while the multipurpose feed roller 13 supplies a sheet of the transparent sheet 373 from the multipurpose tray 12. Accordingly, the color laser printer 1 can form images on separate sheets of the paper 3 through a simple process.

In this way, according to the present embodiment, the color blindness dialog box 66 of the Properties window 65 includes the color blindness process mode checkbox 67, the divided print setting box 268, and the individual color print setting box 269. If the user selects the color blindness process mode checkbox 67 and the divided print setting box 268, a color image 370cmk is formed on normal paper 374 supplied by the feed roller 7 in the three colors magenta, cyan, and black, but excluding yellow, and a single-color yellow image 370y is formed on a transparent sheet 373 supplied by the multipurpose feed roller 13. By viewing both sheets 373, people with color blindness can easily understand the contents of the original color image.

In the above description, an image in yellow is printed on the transparent sheet 373 while a multi-color image formed of the remaining three colors is printed on the normal paper 374. However, the divided printing process is not limited to this specific combination but can be any combination of some colors and the remaining colors. For example, the divided printing process can print any two colors on the transparent sheet 373 and the remaining two colors on the normal paper 374, or can print any three colors on the transparent sheet 373 and the remaining single color on the normal paper 374 to achieve any combination appropriate to people with color blindness.

On the other hand, in Step 204 of FIG. 19, when the divided printing process has not been selected (S204: NO), that is, when the individual color printing process has been selected and, more specifically, when the individual color print setting box 269 is checked, then in S206 it is determined whether the layout printing process has been selected.

Hence, when the checkbox 270 next to the "layout print" if is checked (S206: YES), then in S207 the layout printing process is executed and the process proceeds to S9.

Figure 21:
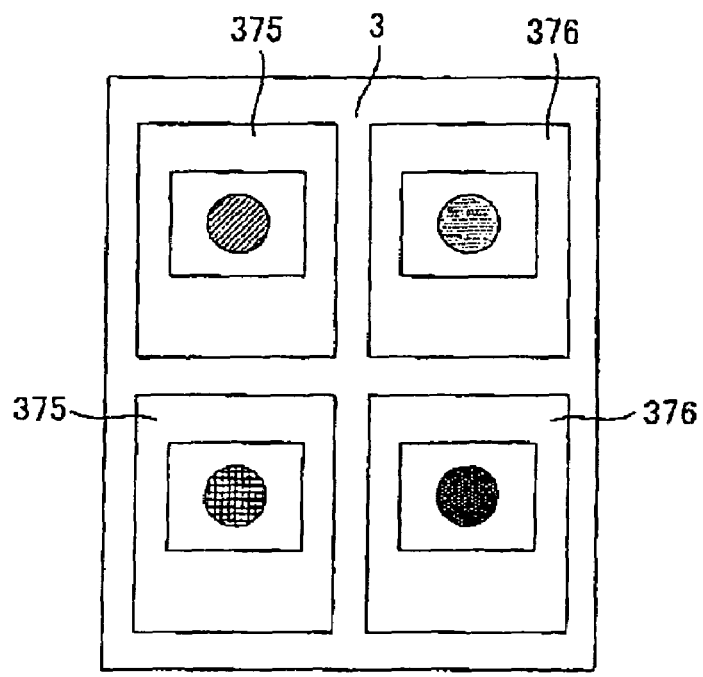
FIG. 21 is an explanatory diagram showing a sheet of paper obtained through a layout printing process in the process of FIG. 19.

More specifically, in S207, a command to execute the layout printing process for processing the subject set of image data (one page's worth of image data) is created. The command and the image data are transmitted to the color laser printer 1 through the interface transmission process of S9. As a result, the color laser printer 1 lays cut and prints on a single sheet of the paper 3, three single-color images 375 for colors of yellow, magenta, and cyan (yellow-, magenta-, and cyan-color component images of the original image) as three first images, and a full-color image 376 formed of the colors yellow, magenta, cyan, and black (original image) as a single second Image as shown in FIG. 21. Thus, the image data indicative of the original image is processed by cooperation of the personal computer 51 and the color laser printer 1 into the three single-color images (Y-color component image, M-color-component image, and C-color-component image) 375 and the full-CMYK-component image 376 of the original image. All of the three single-color images (Y-color component image, M-color-component image, and C-color-component image) 375 and the full-CMYK-component image 376 are printed on four positions on the paper 3. In other words, the command to execute the layout printing process created in S207 serves as data indicative of the layout-printing processed images 375 and 376.

Accordingly, by viewing the single-color images 375, people with color blindness can easily understand the contents of the original image. That is, even if the original color image has a plurality of different-color image regions which are located adjacent to one another and which are difficult to distinguish for people with color blindness, by viewing the three single-color images 375, the people with color blindness can easily distinguish those color image regions from one another. In this way, through a simple process people with color blindness can understand the contents of the original image by viewing each single-color-component image 375. The viewer can also view the original, normal full-color image 376. Further, since the single-color images 375 and the full-color image 376 are formed on a single sheet of the paper 3 in this process, all of the single-color images 375 and the full-color image 376 can be viewed at a glance, enabling the viewer to quickly and efficiently distinguish each of the single-color images 375 and the full-color image 376.

On the other hand, when the layout printing process has not been selected (S206: NO), that is, when the checkbox 271 next to the "multiple-sheet print" has been checked, then in S208 the multiple-sheet printing process is executed and the process proceeds to S9.

Figure 22:
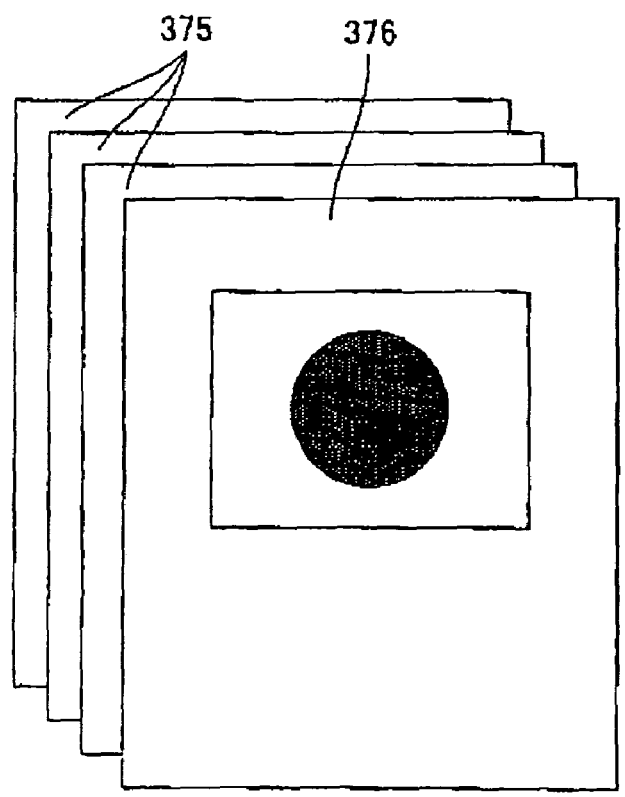
FIG. 22 is an explanatory diagram showing sheets of papers obtained through a multiple-sheet printing process in the process of FIG. 19.

More specifically, in S208, a command to execute the multiple-sheet printing process for processing the subject set of image data (one page's worth of image data) is created. Then, the command and the image data are transmitted to the color laser printer 1 through the interface transmission process of S9. As a result, the color laser printer 1 prints each of the three single-color images 375 of yellow, magenta, and cyan as the first image and the full-color image 376 in yellow, magenta, cyan, and black as the second image individually on four sheets of the paper 3, as shown in FIG. 22. Thus, the image data indicative of the original image is processed by cooperation of the personal computer 51 and the color laser printer 1 into the three single-color images (Y-color component image, M-color-component image, and C-color-component image) 375 and the full-CMYK-component image 376 of the original image The three single-color images (Y-color component image, M-color-component image, and C-color-component image) 375 and the full-CMYK-component image 376 are printed on individual four sheets of paper 3. In other words, the command to execute the multiple-sheet printing process created in S208 serves as data indicative of the multiple-sheet-printing processed images 375 and 376.

As a result, people with color blindness can understand the contents of the original image by viewing the images 375 formed in single colors (yellow-, magenta-, and cyan-color component images of the original image). That is, even if the original image has a plurality of different-color image regions which are located adjacent to one another and which are difficult to distinguish for people with color blindness, by viewing the three single-color images 375, the people with color blindness can easily distinguish those color image regions from one another. The viewer can also view the original, normal full-color image 376 (original image).

In the layout printing process and individual color printing process described above, color images are processed to form images that are easy to distinguish by people with color blindness. Hence, images that are distinguishable by people with color blindness can be formed through a simple process.

In the layout printing process and the multiple-sheet printing process described above, the first images 375 are single-color images each formed of one color that is obtained by excluding three colors from the four colors of yellow, magenta, cyan, and black The three first images 375 and the single second image 376 are arranged and printed in four locations on a sheet through the layout printing process), or are printed on four individual sheets of the paper 3 through the multiple-sheet printing process. However, as each first image 375, a mixed-color image may be formed by mixture of two or three colors that are obtained by excluding two or one color from the four colors of yellow, magenta, cyan, and black. In such a case, one or two first image(s) 375 and the one full-color image 376 are laid out on a single sheet at its two or three portions through the layout print process or are printed on two or three individual sheets 3 through the multiple-sheet printing process.

Figure 23:
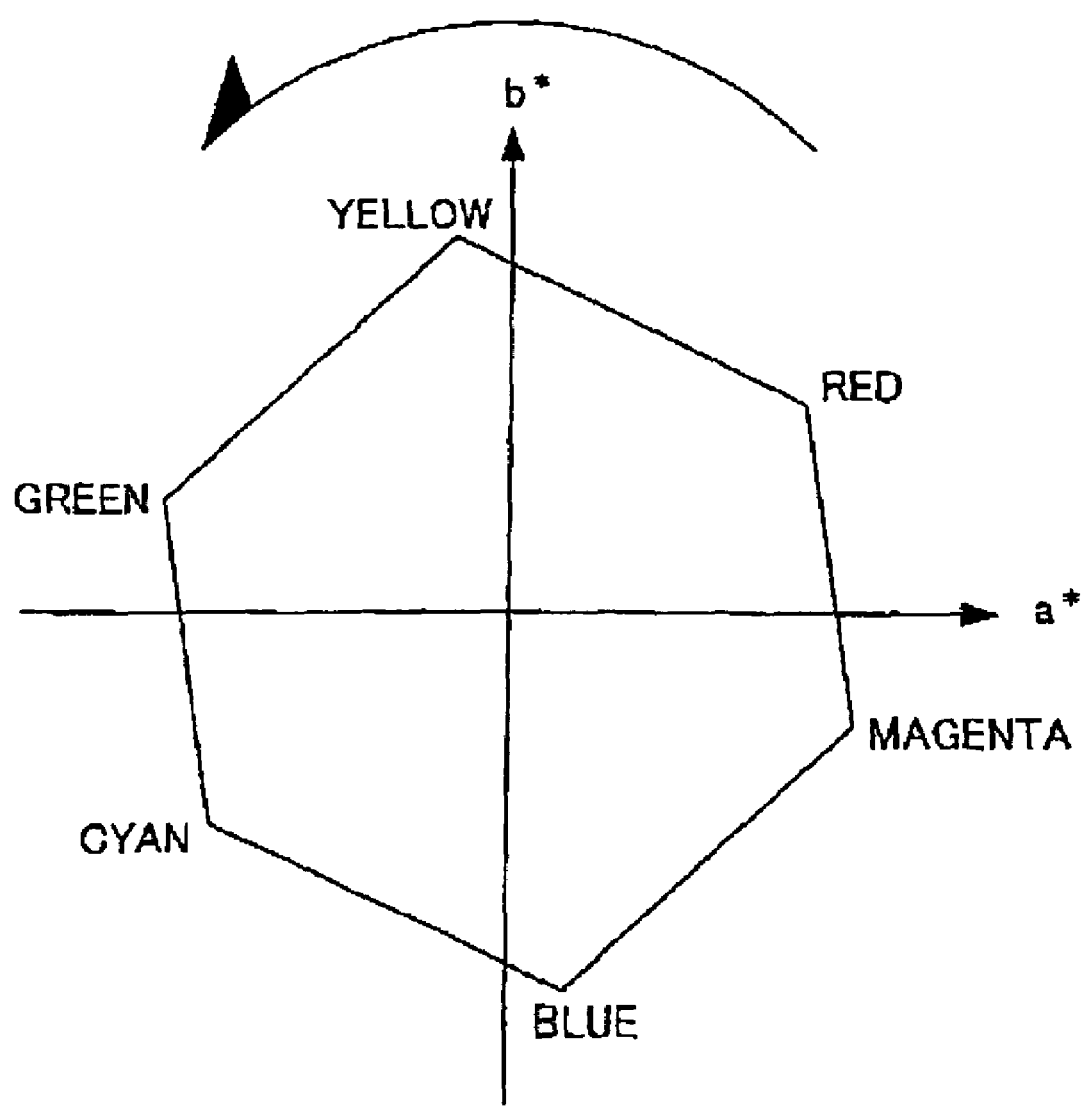
FIG. 23 is an explanatory diagram showing a color plane for the La*b* color system.
Figure 24A:
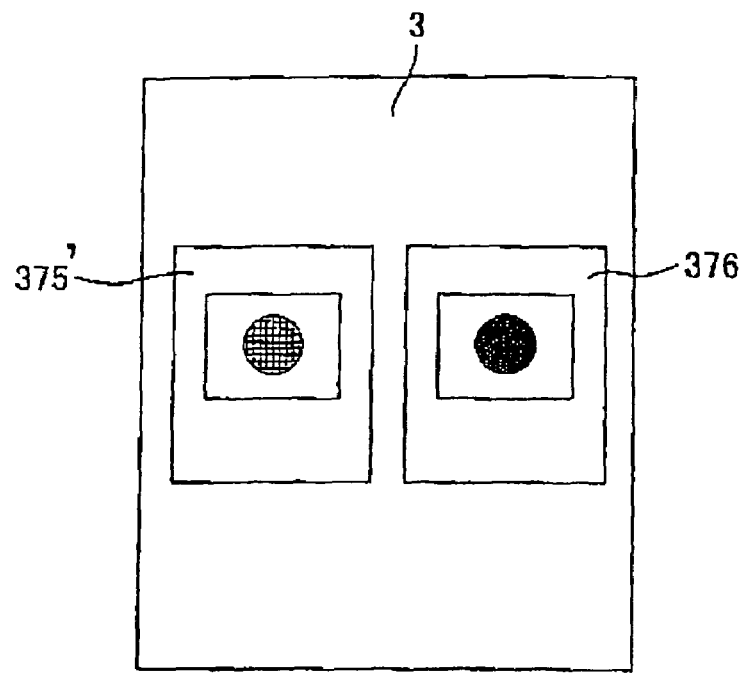
FIG. 24(a) is an explanatory diagram showing a sheet of paper printed with a single hue-converted full-color image and an original full-color image obtained through the layout printing process.
Figure 24B:
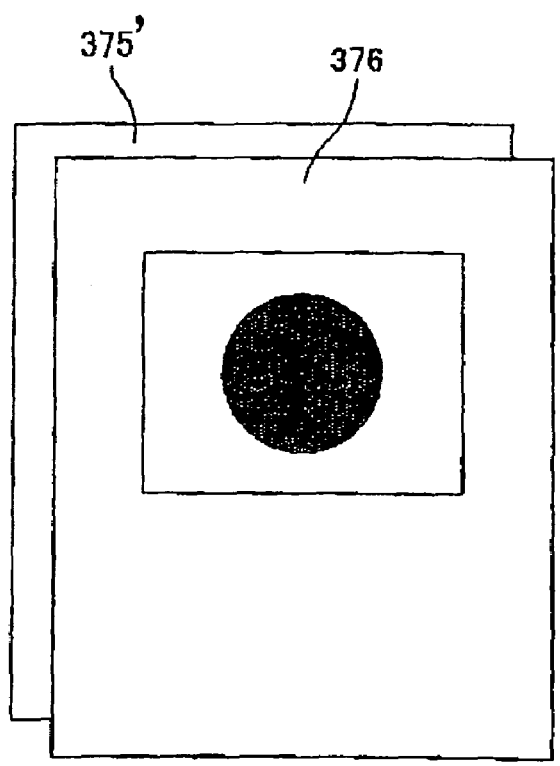
FIG. 24(b) is an explanatory diagram showing sheets of papers printed with a single hue-converted full-color image and an original full-color image obtained through the multiple-sheet printing process.

While the three single-color images 375 and the one full-color image 376 are printed in the above description, instead of printing the three single-color images 375 it is possible to form a single hue-changed full-color image 375' by rotating, as shown in FIG. 23, the color hues of the original full-color image 376 on a color plane of the La*b* color system around the L* axis It is noted that the L* axis extends normal to the plane of sheet of FIG. 23. The hue-changed full-color image 375' and the original full color image 376 may be printed on a single sheet as shown in FIG. 24(a) through the layout printing process of S207 or on two sheets through the multiple-sheet printing process of S208 as shown in FIG. 24(b). In this color-hue conversion process, colors between red and green in the original image data are rotated 120 degrees, for example, counterclockwise (direction of the arrow in FIG. 23) and converted to colors between green and blue. Accordingly, even if the original image has a red region and a green region which are located adjacent to each other, the original red region is converted into green and the original green region is converted into blue. Accordingly, by viewing the converted image 375, people with protano(pia/malous) and with deuterano(pia/malous) can easily distinguish the green and blue regions that are red and green in the original image 376. In this way, through a simple process of converting color hue, color images can easily be made distinguishable to people with protano(pia/malous) and deuterano(pia/malous), for example, who have difficulty distinguishing reds and greens.

A checkbox 273 for selecting this color-hue conversion process can be provided in the color blindness dialog box 66 of the Properties window 65 as indicated by broken line in FIG. 18 to enable the user to select the execution of this process by checking the checkbox 273.

This color-hue conversion process can be executed during the image data process (page process) of the printer driver 64 for converting images created by the application software 63 into CMYK image data that can be printed on the color laser printer 1.

In this way, the hue-converted, full-color image obtained through this color-hue conversion process can be printed as a single first image 375' while the original full-color image is printed as the second image 376 as shown in FIGS. 24(a) and 24(b).

In the above example, color hues between red and green are converted to colors between green and blue by rotating the color hue 120 degrees on the color plane of the La*b* color system shown in FIG. 23. However, any color hue can be rotated at any angle (60 or 90 degrees, for example) in any direction (counterclockwise or clockwise) to suit the specific people with color blindness.

Accordingly, two or more hue-converted, full-color Images 375', which are obtained by rotating the color hues of the original full-color image by two or more different degrees, may be printed as two or more first images 375'.

Especially, when converting color hues through a 120-degree rotation in this way, images can be formed by converting the originally intended color of toner to a different color of toner.

For example, when the toner originally intended for use in the color image is magenta, the color laser printer 1 can be controlled to use yellow toner or cyan toner in place of magenta toner in this type of toner conversion process. Accordingly, it is possible to form images that are distinguishable by people with color blindness through a simple process of converting toner.

A checkbox 274 for selecting this toner conversion process can be provided in the color blindness dialog box 66 of the Properties window 65 as indicated by broken line in FIG. 18. By checking this checkbox 274 the user can select the execution of this toner conversion process.

More specifically, this toner conversion process can be executed by converting YMCK data to MYCK data for example after the printer driver 64 converts RGB data for each pixel to YMCK data corresponding to each toner color in the color laser printer 1.

As described above, the toner conversion process can also print the hue-converted, full-color image 375' that has undergone toner conversion as the first image 375 and the original normal full-color image as the second image 376 as shown in FIGS. 24(a) and 24(b).

While the invention has been described in detail with reference to the specific embodiments thereof, it would be apparent to those skilled in the art that various changes and modifications may be made therein without departing from the spirit of the invention.

For example, in the above description, the printer driver 64 operates based on the page description language (PDL), but the printer driver 64 may also operate based on GDI (Graphics Device Interface). In the latter case, the printer driver 64 converts the RGB data to YMCK data corresponding to the toner colors after completing the process or the color blindness process mode.

In the above description, the printer driver 64 is installed on the personal computer 51, and the personal computer 51 serves as the image processing device for processing images for controlling the color laser printer 1 to print out the processed images. However, the CPU in the color laser printer 1 can be set up to execute a color blindness process mode, for example, wherein the color blindness process mode may be operated on an operating panel of the color laser printer 1. In such a case, the color laser printer 1 serves as an image forming device for processing images and then printing out the images Further, instead of using the color laser printer 1 employing an intermediate transfer system, it is possible to use other various types of image forming device, such as a color laser printer employing a tandem system, a color inkjet printer, and the like.

In the above description, the color blindness process mode is provided in the printer driver 64. However, the color blindness process mode may be provided in a software program other than the printer driver 64 or in the image processing device.

In the example described above, image data having color data of the RGB color system is employed. However, the same processes can be applied to image data having color data of the La*b* color system.

What is claimed is:

1. An image processing device for processing image data, comprising:
    an image input portion receiving image data indicative of an image; and
    an image processing portion processing the image data into processed image data indicative of a processed image which has image portions easy to distinguish, wherein:
        the image processing portion includes an image output portion forming the processed image based on the processed image data on a recording medium,
        the image processing portion includes a color image processing portion processing a color state of an entire part of the original image, and
        the image data is indicative of an original color image having a color hue, the color image processing portion processing the original color image into a processed color image whose color hue is determined by rotating the color hue of the original color image on a predetermined color plane.

2. An image processing device according to claim 1, wherein the image processing portion processes the image data indicative of an image, which has image portions difficult to distinguish by people with color blindness, into the processed image data indicative of the processed image whose corresponding image portions are easy to distinguish by people with color blindness.

3. An image processing device according to claim 1, further comprising an execution selecting portion selecting whether to control the image processing portion to execute its processing operation.

4. An image processing device according to claim 3, wherein the execution selecting portion includes a mode setting portion enabling a user to set a predetermined process mode, the execution selecting portion determining to control the image processing portion to execute its processing operation when the predetermined process mode is set.

5. An image processing device according to claim 1, wherein the color image processing portion processes the original image into a first color image and a second color image whose color state is different from color state of the first color image.

6. An image processing device according to claim 5, wherein the color image processing portion forms the first and second color images on a single sheet of recording medium.

7. An image processing device according to claim 5, wherein the color image processing portion forms the first and second color images on different sheets of recording medium.

8. An image processing device for processing image data, comprising:
    an image input portion receiving image data indicative of an image; and
    an image processing portion processing the image data into processed image data indicative of a processed image which has image portions easy to distinguish, wherein:
        the image processing portion includes an image output portion forming the processed image based on the processed image data on a recording medium,
        the image data includes original text data indicative of a text located in the image and surrounding-image data indicative of a surrounding image that is located in the image at a portion surrounding the text and
        the image processing portion processes the image data for at least a border portion between the text and the surrounding-image into the processed image data allowing the text to become easy to distinguish from the surrounding image, and
        the image processing portion processes the image data for at least the border portion into the processed image data allowing the text to become easy to distinguish by people with color blindness from the surrounding image.

9. An image processing device according to claim 8, wherein the image processing portion processes the original text data into a processed text data indicative of a processed text.

10. An image processing device according to claim 9, wherein the processed text data is indicative of the processed text which is formed from the original text added with an outline.

11. An image processing device according to claim 9, wherein the original text data indicates original color of the original text, the processed text data indicating the processed text whose color is different from the original color.

12. An image processing device according to claim 8, wherein the image data further includes original graphics data indicative of an original graphics image, the text and the graphics image being located as being superimposed one on another, and
    wherein the image processing portion processes the original graphics data into a processed graphics data indicative of a processed graphics image.

13. An image processing device according to claim 12, wherein the original graphics data indicates the original graphics image which has distribution of a plurality of different colors, the processed graphics data indicating the processed graphics image which has a single color with a single tone.

14. An image processing device according to claim 12, wherein the original graphics data indicates the original graphics image which has distribution of a plurality of different tones, the processed graphics data indicating the processed graphics image which has a single color with a single tone.

15. An image processing device according to claim 12, wherein the image processing portion deletes the original graphics data from the image data.

16. An image processing device according to claim 8, further comprising an execution selecting portion selecting whether to control the image processing portion to execute its processing operation.

17. An image processing device according to claim 16, wherein the execution selection portion includes a judging portion judging whether or not the image data includes the original text data and original graphics data indicative of an original graphics image, the execution selection portion determining to control the image processing portion to execute its processing operation when the image data includes both of the original text data and the original graphics data.

18. An image processing device according to claim 17, wherein the judging portion further judges whether or not the original text and the original graphics image are located as being superimposed one on the other, the execution selection portion determining to control the image processing portion to execute its processing operation when the original text and the original graphics image are located as being superimposed one on the other.

19. An image processing device according to claim 17, wherein the judging portion further judges whether or not color type indicated by the original text data and color type indicated by the original graphics data are in a predetermined color type combination, the execution selection portion determining to control the image processing portion to execute its processing operation when the color type indicated by the original text data and the color type indicated by the original graphics data are in the predetermined color type combination.

20. An image processing device according to claim 19, wherein the predetermined color type combination is combination of red type color and green type color.

21. An image processing device according to claim 16, wherein the execution selecting portion includes a mode setting portion enabling a user to set a predetermined process mode, the execution selecting portion determining to control the image processing portion to execute its processing operation when the predetermined process mode is set.

22. An image processing device for processing image data, comprising:
   an image input portion receiving image data indicative of an image;
   an image processing portion processing the image data into processed image data indicative of a processed image which has image portions easy to distinguish; and
   an image extracting portion extracting from the image an image region that includes at least two image portions which are located adjacent to each other and which are difficult to distinguish, the processing portion processing the image data indicative of at least a part of the extracted image region,
   wherein:
      the image extracting portion extracts the image region that includes the at least two image portions which are difficult to distinguish by people with color blindness.
      the image data includes color data indicative of color of each pixel located in the image,
      the image extracting portion includes a color type determining portion determining color type of each pixel located in at least a part of the entire image, the image extracting portion extracting, based on the determined color type of the each pixel, the image region that includes at least two image portions that have different color types, and
      the image processing portion includes an image output portion forming the processed image based on the processed image data on a recording medium.

23. An image processing device according to claim 22, wherein the image extracting portion further includes a brightness determining portion determining the level of brightness of each pixel located in at least the part of the image, the image extracting portion extracting, based on the determined color type and brightness level of the each pixel, the image region that includes at least two image portions that have different color types and that have similar brightness levels.

24. An image processing device according to claim 23, wherein the image extracting portion extracts the image region that includes pixels of red color type and pixels of green color type, whose brightness levels are similar to each other and which are located adjacent to each other.

25. An image processing device according to claim 22, further comprising a selection input portion enabling a user to input his/her selection whether or not to control the image extracting portion to execute its extracting operation.

26. An image processing device according to claim 25, wherein the selection input portion further enables the user to input his/her selection whether or not to control the image processing portion to execute its processing operation.

27. An image processing device according to claim 26, wherein the selection input portion further enables the user to input data of at least one of a type and a degree of color blindness.

28. An image processing device according to claim 27, further comprising a storage portion storing at least one of data indicative of the user's selection related to the extracting operation, data indicative of the user's selection related to the processing operation, and the inputted data of the at least one of the type and the degree of color blindness.

29. An image processing device according to claim 27, wherein the selection input portion includes a display portion displaying an entry space enabling the user to input the data of the at least one of the type and the degree of color blindness.

30. An image processing device according to claim 27, wherein the image processing portion processes the image data dependently on the inputted data of the at least one of the type and the degree of color blindness.

31. An image processing device according to claim 25, further comprising an extraction-result notifying portion notifying the extracted results.

32. An image processing device according to claim 22, wherein the extracted image region includes a first color image portion with a first color and a second color image portion with a second color different from the first color which are located adjacent to each other in the image, the first color image portion having a first border portion, the second color image portion having a second border portion, the first and second border portions being adjacent to each other, and
   wherein the image processing portion processes image data indicative of at least one of the first and second border portions.

33. An image processing device according to claim 32, wherein the image processing portion processes color of the image data indicative of the at least one of the first and second border portions into a third color different from the first and second colors.

34. An image processing device according to claim 33, wherein the image processing portion processes brightness of the image data indicative of the at least one of the first and second border portions.

35. An image processing device according to claim 33, wherein the image processing portion processes color hue of the image data indicative of the at least one of the first and second border portions.

36. An image processing device according to claim 35, wherein the image processing portion changes the amount of an yellow color component in the image data indicative of the at least one of the first and second border portions.

37. An image processing device according to claim 33, wherein the image processing portion processes the image data indicative of the at least one of the first and second border portions into processed image data indicative of formation of no image on the at least one of the first and second border portions.

38. An image processing device according to claim 33, wherein the image processing portion processes the image data indicative of the at least one of the first and second border portions based on brightness of the first and second image portions.

39. An image processing device according to claim 38, wherein the image processing portion processes the image data indicative of the at least one of the first and second border portions into processed image data indicative of formation of no image on the at least one of the first and second border portions when the brightness levels of the first and second image portions are smaller than a predetermined brightness.

40. An image processing device according to claim 38 wherein the image processing portion processes color of the image data indicative of the at least one of the first and second border portions into black when the brightness levels of the first and second image portions are greater than a predetermined brightness.

41. An image processing device according to claim 32 wherein the first color is red and the second color is green.

42. An image processing device according to claim 41, wherein brightness of the first color image region and brightness of the second color image region are similar to each other.

* * * * *